(12) United States Patent
Eteminan

(10) Patent No.: US 6,426,956 B1
(45) Date of Patent: *Jul. 30, 2002

(54) VOICE-BROWSING SYSTEM AND METHOD THEREFOR

(76) Inventor: Eshagh Isaac Eteminan, 1170 W. Canary Way, Chandler, AZ (US) 85248

( * ) Notice: Subject to any disclaimer, the term of this patent is extended or adjusted under 35 U.S.C. 154(b) by 0 days.

This patent is subject to a terminal disclaimer.

(21) Appl. No.: 09/541,727

(22) Filed: Apr. 3, 2000

Related U.S. Application Data

(63) Continuation-in-part of application No. 09/495,391, filed on Jan. 31, 2000.

(51) Int. Cl.[7] .............................................. H01L 12/28
(52) U.S. Cl. ...................... 370/401; 370/386; 370/328; 709/203
(58) Field of Search ................................ 370/230, 432, 370/389, 352, 386, 328, 410, 401; 709/227, 223, 230, 232, 231, 249, 206, 302, 203, 229, 246; 455/404, 445, 557, 435; 379/88.17, 58; 705/37; 345/339; 707/3

(56) References Cited

U.S. PATENT DOCUMENTS

| | | | |
|---|---|---|---|
| 3,836,714 A | 9/1974 | Pomper et al. | 179/1 |
| 3,909,547 A | 9/1975 | Day | 179/40 |
| 5,077,554 A | 12/1991 | Orita et al. | 340/825 |

(List continued on next page.)

OTHER PUBLICATIONS

"Motorola Delivers Voice–Activation of The Barclaycard Website" www.voxml.com; pp. 1–12 dated Dec. 31, 1999.

"Requirements For A Markup Language For HTTP–mediated Interactive Voice Response Services" Peter Danielson, et al.; Website www.research.att.com; pp. 1–5; dated Dec. 31, 1999.

"VoxML 1.1 Language Reference" Motorola Inc.; dated Apr. 1, 1999.

*Primary Examiner*—Hassan Kizou
*Assistant Examiner*—John Pezzlo
(74) *Attorney, Agent, or Firm*—Lowell Gresham; Jordan Meschkow; Meschkow & Gresham PLC

(57) ABSTRACT

A system (230) for voice browsing utilizing a telecommunication network (24) is provided. The system (230) includes a subscriber unit (30) and a system server (242). The subscriber unit (30) is configured to generate an origination packet (50) containing a voice frame (54), and to transmit the origination packet (50) utilizing a wireless non-circuit-switched service (106) of network (24). The subscriber unit (26) and the system server (242) are coupled through a cellular telephone site (234) of the network (24). The system server (242) is configured to receive the origination packet (50), to construct a text request (264) in response thereto, to generate a VXML query (244) therefrom, to fetch a VXML reply (246) from an application server (232) in response to the VXML query (244), to generate a text response (280) therefrom, to construct a destination packet (52) in response thereto, and to transmit the destination packet (52) to the subscriber unit (30) The subscriber unit (28) is configured to receive the destination packet (52) utilizing the non-circuit-switched service (106) of the network (24), and to present the contents of the destination packet (52) to a subscriber (250).

24 Claims, 10 Drawing Sheets

U.S. PATENT DOCUMENTS

| | | | | |
|---|---|---|---|---|
| 5,125,101 A | | 6/1992 | Johnson | 455/9 |
| 5,282,204 A | | 1/1994 | Shpancer et al. | 370/94.2 |
| 5,408,466 A | | 4/1995 | Ablay | 370/24 |
| 5,563,931 A | * | 10/1996 | Bishop et al. | 455/404 |
| 5,610,920 A | | 3/1997 | Doll et al. | 370/389 |
| 5,761,193 A | | 6/1998 | Derango et al. | 370/312 |
| 5,881,370 A | | 3/1999 | Pottala et al. | 455/78 |
| 5,912,882 A | | 6/1999 | Yafuso et al. | 370/270 |
| 5,920,826 A | * | 7/1999 | Metso et al. | 455/557 |
| 5,926,745 A | | 7/1999 | Threadgill et al. | 455/12.1 |
| 5,940,771 A | | 8/1999 | Gollnick et al. | 455/517 |
| 5,958,016 A | * | 9/1999 | Chang et al. | 709/229 |
| 5,983,099 A | | 11/1999 | Yao et al. | 455/426 |
| 6,009,469 A | * | 12/1999 | Mattaway et al. | 709/227 |
| 6,021,326 A | | 2/2000 | Nguyen | 455/422 |
| 6,026,087 A | | 2/2000 | Mirashrafi et al. | 370/389 |
| 6,047,327 A | * | 4/2000 | Tso et al. | 709/232 |
| 6,112,083 A | | 8/2000 | Sweet | 455/426 |
| 6,112,085 A | | 8/2000 | Garner et al. | 455/428 |
| 6,134,432 A | | 10/2000 | Holmes et al. | 455/412 |
| 6,134,450 A | | 10/2000 | Nordeman | 455/517 |
| 6,208,659 B1 | * | 3/2001 | Govindarajan et al. | 370/410 |
| 6,253,249 B1 | * | 6/2001 | Belzile | 709/249 |

* cited by examiner

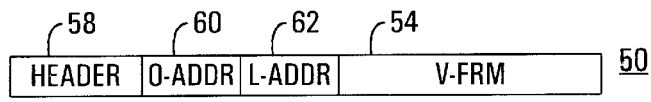
FIG. 2
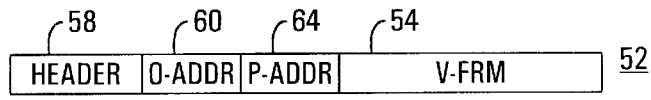
FIG. 3
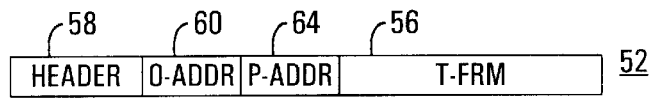
FIG. 4
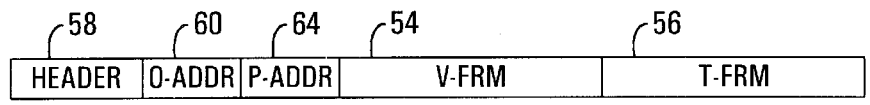
FIG. 5
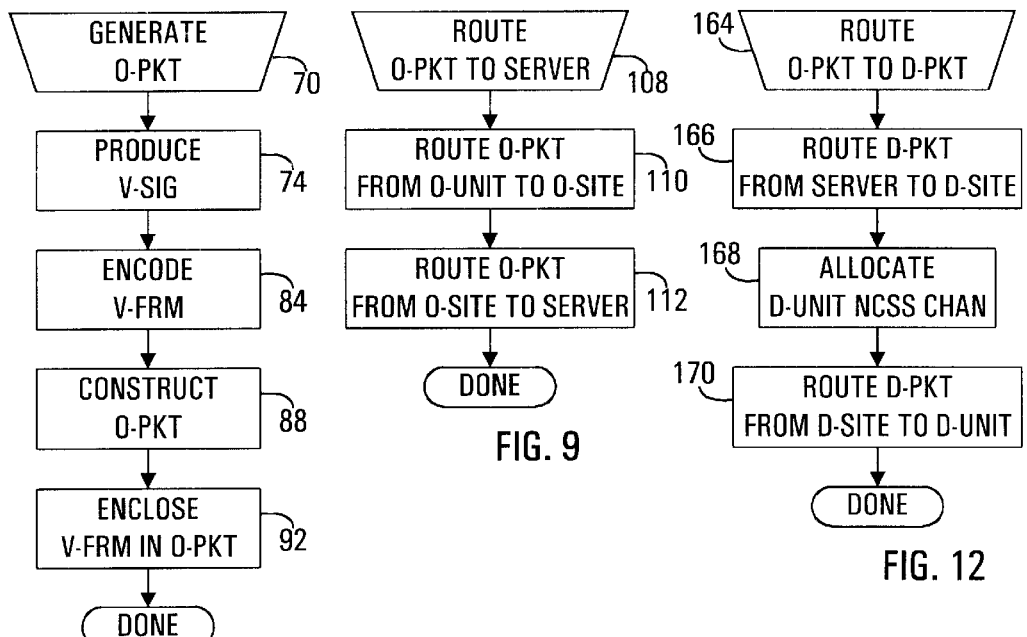
FIG. 7
FIG. 9
FIG. 12

42

VOICE-BROWSING SYSTEM AND METHOD THEREFOR

RELATED INVENTION

The present invention is a continuation in part (CIP) of "SYSTEM FOR DISPATCHING INFORMATION PACKETS AND METHOD THEREFOR," U.S. patent application Ser. No. 09/495,391, filed Jan. 31, 2000, which is incorporated by reference herein.

TECHNICAL FIELD OF THE INVENTION

The present invention relates to the field of wireless communication. More specifically, the present invention relates to voice browsing using a wireless communication network.

BACKGROUND OF THE INVENTION

There is a considerable need for dispatch communications, i.e., simplex bi-directional communications between a dispatcher and remote (field) units. This need is conventionally filled by specialized equipment operating over dedicated frequencies. Examples of this type of equipment are the dispatch radios used by police, fire, ambulance, taxi, and delivery services. In dispatch systems, a single dispatch unit typically uses one frequency (frequency "A") for transmission and another frequency (frequency "B") for reception, with all field units using frequency "B" for transmission and frequency "A" for reception.

Dispatch radios share many problems with other simplex systems, e.g., construction-site walkie-talkie radios, personal-service radios, and other business radios. In such systems, all units typically use a single frequency for both transmission and reception. By necessity, the number of units i n such systems is severely limited.

Such communication systems are often simplex. That is, a given unit may only transmit or receive at one time, but not both. This limitation is both a weakness and a strength of such systems. Since only one unit of a communicating pair may be transmitting at one time, interruptions are impossible, regardless of the urgency involved. On the other hand, the equipment need not have the complexity and expense of full duplex communication equipment. Because of their similarities, dispatching and single-frequency systems may be generally classed as push-to-talk (PTT) systems for the purposes of this discussion.

PTT systems suffer from a significant number of problems. A major one of these problems is that PTT systems are typically proprietary. That is, the equipment for a given system is often made by a single manufacturer. This obliges the user/owner to deal with this single manufacturer. The equipment is therefore often more expensive than similar equipment for other services, even though that other equipment may be more sophisticated than the needed equipment. The reasons for this are complex, involving the scale of production as well as the lack of competition.

Similarly, such equipment often must be serviced by specially trained and licensed personnel. Again, being a small market, a given area will often have only a small pool of qualified service agencies/personnel. Such an agency is typically licensed or certified by the manufacturer. This again leaves the user/owner at the mercy of the manufacturer through the service personnel, resulting in a decrease in competition and an increase in service expenses.

Because such PTT equipment is often manufactured and serviced by a single company, the user/owner may well be left without support of any kind should that manufacturer cease to do business. Alternatively, the user/owner of the equipment may be faced with a considerable difficulty should the local service agency of the equipment manufacturer cease to represent that manufacturer. This often necessitates that the equipment be returned to the manufacturer for servicing, thereby effecting unreasonable delays.

PTT systems are typically manufactured to fulfill specific and unique requirements. That is, while the PTT dispatch system used by a taxicab company is similar in design and function to that used by a fire department, they are designed to operate at different frequencies and are not interchangeable. This non-interchangeability extends beyond physical constraints and into the areas of licensing and legislation. Therefore, a small rural volunteer fire department on a tight budget is constrained from using donated taxi dispatching systems. The systems and their components are not interchangeable.

Because of this incompatibility of hardware and operating frequencies, two different PTT systems cannot readily intercommunicate. For example, in an emergency situation it may be desirable to coordinate police, fire, and medical field units from a single dispatching unit. This is not normally feasible without a special cross-service dispatching unit and/or multiple dispatching units in the same location. Overcoming such incompatibilities increases the expense of each of the systems while being an inefficient compromise at best. Additionally, the use of such a centralized and complex dispatching center often necessitates the use of a highly skilled and specially trained dispatcher (operator). This, too, increases system expense.

PTT systems typically operate within specific frequency bands by law. These bands have limited capabilities, thus creating a problem when many services must use the same band. Since each PTT system providing a given class of service, e.g., taxicab dispatching, must share the same band while simultaneously utilizing different channels (frequency allocations with the band), such channels are often at a premium in large metropolitan areas. Occupation of all available channels in a given area would prohibit the assignment of another channel in that area. Therefore, a potential new user may be inhibited from receiving a needed license.

Likewise, since a shortage of channels may produce a waiting list for licenses, the loss of a license for a given channel, however briefly and for whatever reason, may result in the assignment of that specific channel to a new licensee, thereby effectively driving the former license holder out of business.

PTT systems also have coverage problems. Not only does the specific equipment have an operating range limited by design, the operating range is also limited by geography. For example, operation is typically limited to "line-of-sight" for the frequencies and signals involved. Shadows may thereby be cast by natural and artificial geography. In a typical scenario, for example, a taxicab dispatching service may lose contact with any cab in an area shadowed by a hill. Similarly, a messenger service may have only intermittent and unpredictable contact with messengers in a downtown area due to a large number of steel and concrete buildings. Both problems derive from the very structure of a PTT dispatching system. That is, all mobile field units must communicate with a fixed dispatching unit via an electromagnetic line-of-sight. Therefore, if the geophysical relationship between the field unit and the dispatching unit is such as to inhibit transmission and/or reception, then communication is lost.

Dispatching systems make up a significant portion of PTT systems in use. PTT dispatching systems typically have a single dispatching unit and a plurality of field units. As previously mentioned, the dispatching unit may transmit on frequency "A" and receive on frequency "B," while the field units transmit on frequency "B" and receive on frequency "A." This means that a PTT dispatching system has an assigned dispatching unit that differs in kind as well as operation from the field units.

The centralized dispatching unit of a PTT dispatch system typically transmits to all field units simultaneously. That is, a typical two-frequency PTT dispatching system cannot readily communicate to only a subset of the assigned field units. There are systems in which selective dispatching is implemented, but all such systems are expensive and inefficient. For example, each field unit may have an address affixed to the beginning of each dispatch intended exclusively therefore. The use of such an address header therefore allows private messages to be dispatched. However, this increases radically in complexity when multiple (but not all) field units are to be addressed.

In an alternative dispatching scheme, the centralized dispatching unit may have multiple transmission frequencies. This allows normal dispatches (i.e., those intended for all field units) to be transmitted on a first frequency with selective dispatches being transmitted on a second frequency. In this scheme, the dispatcher would instruct the appropriate field units to switch to the second frequency prior to the transmission of a selective dispatch. However, this scheme requires an increase in complexity in both the dispatch and field units, including the incorporation of a switching mechanism with a corresponding decrease in reliability.

The complexity of dispatching to selected units using known conventional dispatching schemes increases dramatically when the number and addresses of the selected units is dynamic. In a highly dynamic emergency situation, for example a forest fire, the "groups" to be addressed may change many times in the course of the emergency as personnel move from one location to another. Conventional dispatching systems simply lack the flexibility to change fast enough to optimize the dispatching. Rather, under most such dynamic situations, the dispatcher is reduced to general all-unit dispatching only.

There are many circumstances when general all-unit dispatches are less than optimal. For example, peace officers may be making a covert entry into a building. The last thing desired in such a situation is a sudden outburst over the radio. Selective dispatching, therefore, should not only be capable of easily and efficiently dispatching to only selected field units, it should be capable of easily and efficiently not dispatching to selected field units. This is not easily accomplished with currently available PTT dispatching systems.

Another problem exists with conventional PTT dispatching systems in that multi-level dispatching is not practical without exceptionally complex equipment and/or operations. In a multi-level dispatching scheme of four levels (e.g., headquarters, groups, teams, field units), an overall dispatcher at headquarters would be capable of dispatching down directly to all group dispatchers, team dispatchers, and field units. Each group dispatcher would be capable of dispatching down to all team dispatchers and field units within that group, and up to the headquarters dispatcher. Each team dispatcher would be capable of dispatching down to all field units within that team, up to the group dispatcher for that team, and (optionally) up to the headquarters dispatcher. Each field unit would be capable of dispatching up to the team dispatcher for that team, (optionally) up to the group dispatcher, and (optionally) up to the headquarters dispatcher. Such a "chain of command" structure is ideal for coordination during major emergencies (such as earthquakes or floods), but cannot be readily realized with conventional PTT dispatching services without the complexity and expense of military-type equipment.

The dispatching unit of a PTT system is different in kind to the field units. The dispatching unit is typically a fixed "base station." As such, the dispatching unit is tied to mains service and is not mobile. This causes PTT dispatching systems to be severely handicapped during fluid situations where the base station may be lost. To cover for such circumstances, a "mobile base unit" may be used, typically an alternative base station mounted in a truck or other vehicle. Such a mobile base station adds significantly to the overall expense of a PTT system. The expense involved often drives such a feature beyond the range of small communities who, ironically, may best benefit from it.

Again, because the dispatch unit of a PTT dispatch system is inherently different than a field unit, a field unit cannot normally be used as an alternative dispatch unit in the event of failure of the dispatch unit. Therefore, the integrity of the entire system depends upon the integrity of a single dispatch unit. Should the dispatch unit fail, the entire system fails. This poses a less-than-optimal situation when the PTT dispatch system is critical, necessitating the acquisition of a second dispatch unit whose sole function is to stand by in case the primary dispatch unit should fail. Again, this represents a waste of resources.

Where the PTT dispatch system is less critical, the failure of the dispatch unit causes the system to be inoperative while the dispatch unit is repaired or replaced. This necessitates the use of alternative communications (e.g., telephones), which provide an awkward solution at best.

The field units in some PTT dispatch systems do not normally have the ability to intercommunicate. That is, the field units in a system normally all transmit on frequency "B" and receive on frequency "A." No field unit can then receive the transmission from another field unit. This lack of intercommunication necessitates that a typical field unit may convey information to another field unit only through the dispatch unit. This places an additional burden upon the dispatcher and slows down the conveyance of intelligence, making coordinated efforts more difficult.

Certain types of specialized field units have the ability to transmit and receive upon alternative frequencies. When this ability is engaged, those specific field units effectively are removed from the PTT dispatch system and become a local single-frequency PTT system. This condition poses the potential of a serious problem during a crisis situation. While the needed and necessary local intercommunication is enabled, those field units are inhibited from receiving information from the dispatch unit. Such information may be critical, e.g., the inability of expected backup to arrive when planned.

Another problem exists with conventional PTT dispatching system in that, other than by direct query and extrapolation therefrom, the dispatcher has no way of knowing the locations of the field units. This means that, even if sophisticated multi-channel equipment is used, the dispatch unit cannot readily transmit a zone dispatch, i.e., a dispatch to all units within a specific geographical area. During a crisis, considerable effort is expended for the sole purpose of keeping track of the individual field units. This effort often entails several people and a considerable amount of traffic for location determination. Such an ability, totally lacking in conventional PTT dispatching systems, would be invaluable coordinating even a small crisis (e.g., the coordination of taxicabs with the near-simultaneous arrival and departure of several major flights during a rush hour).

Conventional PTT dispatching systems often lack in system security. Such systems typically use conventional amplitude or frequency modulation (AM or FM) utilizing analog (i.e., non-digital) modulation techniques. This approach, while cost-effective, is very insecure and does little to inhibit eavesdropping.

A courier service, for example, depends heavily upon its established customer base for survival. Were an unscrupulous competitor to eavesdrop upon the courier service's dispatches for a relatively short period of time, that competitor might then be in a position to determine the courier service's major clients and the number of pick-ups and deliveries per week. With this information, the competitor may be able to successfully underbid the courier service for those clients.

In a similar but more critical vein, were an unscrupulous press able to monitor police dispatches during a major crisis, important information may be leaked that would jeopardize negotiations and perhaps cost lives.

One answer to the eavesdropping problem is to encrypt the information. This is a straightforward procedure in digital systems, but somewhat cumbersome and expensive in analog systems. While encryption can be successfully used in critical PTT dispatching services (police, fire, etc.), it is often cost-prohibitive for business systems.

Attempts to substitute for encryption often involve the use of elaborate codes. Such codes may require considerable training, hence expense, and are far from foolproof. A single disgruntled employee or lost/stolen codebook is all that is needed to compromise such a code.

In addition, a fundamental failing of conventional PTT systems is an inability to interface with the outside world. This lack of interface means an inability to place a telephone call through the system without involving the dispatcher. This type of situation may arise, for example, should an individual field employee (an employee with a field unit) be awaiting the results of a medical test for him/herself or a family member. The employee is faced with three choices. The employee may have the doctor or laboratory contact him/her through the system (in violation of individual privacy rights). The employee may stop and call the doctor or laboratory repetitively from a telephone until the results are available (inconvenient to both the employee and the employer). Or the employee may stay at home until the results are available (even more inconvenient and a loss of income to both the employee and the employer)

Associated with this lack of outside-world interface is the inability to summon emergency services when seconds may count. This inability may directly endanger lives and/or property.

With the proliferation of cellular telephone service, the replacement of PTT systems with cellular telephone systems is now possible. Unfortunately, the use of standard cellular telephone systems in lieu of PTT systems is not easily accomplished.

The first problem encountered when replacing a PTT system with a cellular telephone system is that of overkill. The replacement of a simplex communication system with a full-duplex system represents a significant waste of resources. Not only must adequate bandwidth for full duplex communication be allocated, it often must be allocated for the full duration of the conversation, i.e., from the time the connection is made until the parties hang up. These inefficiencies are a result of the circuit-switched services of cellular telephony, and are directly translatable into fiscal losses.

Additionally, the call time for a cellular telephone service is significantly greater than that of a PTT service for a given message. Again, this is due to the active set up time needed for each call, and also for the fact that a cell phone's transmitter must occasionally transmit even when the phone is only receiving. This excess of transmission leads to a shorter battery life than desired.

Another problem is that, since a cellular telephone system is capable of calling any other telephone anywhere in the world, it uses a dialing scheme essentially the same as the traditional wire-based telephone system. Therefore, even with one-button dialing, there is a considerable time between the commencement of dialing and the completion of the connection so that communication may occur. This delay, while small for any single call, quickly becomes unmanageable when the standard cellular system is used as a PTT dispatching system replacement.

What is needed therefore, is a system that is broad in functionality, is wide in area of coverage, is easily accessible, is pervasive, requires no special licenses, requires no special equipment, is inexpensive to use, has the flexibility of the global cellular telephone system, and has the rapidity and ease of use of a conventional PTT dispatching system.

In a related circumstance, cellular telephones may be used to communicate with automated voice systems to gather information. This circumstance is referred to as voice browsing herein. With voice browsing, an operator may make a connection with a provider to obtain specific information, communicates with the provider by voice or code, and receives the information by voice. For example, a subscriber may connect with a traffic information service, indicate a "zone" or area of concern by speaking a single number ("five") or pressing a single digit ("5"), and receive an audible traffic report for that zone (zone five).

A problem exists, however, in making the provider connection. Conventional cellular telephones, being capable of calling any other telephone anywhere in the world, use a circuit-switched dialing scheme, as does the traditional wire-based telephone system. Therefore, there is a considerable time between the commencement of dialing and the completion of the connection. This delay, while small for any single call, quickly becomes objectionable and inconvenient for repetitive calls, as might be required by delivery personnel. For push-button (i.e., conventional) cellular telephones, the very act of dialing, if done by the driver of a moving vehicle, poses a distinct danger.

With the advent of voice-activated cellular telephones, this problem is somewhat ameliorated. However, a call is still made, with the associated connection and airtime fees. While the fees for any given call may be, perhaps, insignificant, the many calls made by delivery and route personnel may accumulate to a quite considerable fee.

Another disadvantage of using conventional cellular services for voice browsing is that the subscriber may not be in a position to receive and assimilate the information at the time the information is returned. This is especially critical in a moving vehicle, where the necessities of driving may have drawn the subscriber's attention away from the telephone.

What is needed therefore, is a voice-browsing system that is broad in functionality, is wide in area of coverage, is easily accessible, is pervasive, is inexpensive to use, utilizes the global cellular telephone system, and has the rapidity and ease of use of a direct connection.

SUMMARY OF THE INVENTION

Accordingly, it is an advantage of the present invention that an improved system for voice browsing and a method therefor are provided.

It is another advantage of the present invention that a voice-browsing system is provided utilizing a conventional (non-proprietary) cellular telephone system.

It is another advantage of the present invention that a voice-browsing system is provided that permits silent (text) reception of a voice page.

It is another advantage of the present invention that a voice-browsing system is provided that utilizes a conventional cellular system while effectively eliminating dial-up delay.

The above and other advantages of the present invention are carried out in one form by a method of voice browsing utilizing a telecommunication network. An origination packet containing a voice frame is transmitted by a subscriber unit. The origination packet is routed to a system server via the telecommunication network utilizing a wireless non-circuit-switched service thereof. Within the system server, the origination packet is converted into a markup-language (ML) query. The ML query is transmitted from the system server to an application server. Within the application server, an ML reply is fetched in response to the ML query. The ML reply is received from the application server at the system server. The ML reply is converted into a destination packet within the system server. The destination packet is routed to the subscriber unit via the telecommunication network utilizing the wireless non-circuit-switched service thereof. The destination packet is received at the subscriber unit.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a graphic representation of an origination packet in accordance with a preferred embodiment of the present invention;

FIG. 3 shows a graphic representation of a destination packet having a voice frame in accordance with a preferred embodiment of the present invention;

FIG. 4 shows a graphic representation of a destination packet having a text frame in accordance with a preferred embodiment of the present invention;

FIG. 5 shows a graphic representation of a destination packet having both a voice frame and a text frame in accordance with a preferred embodiment of the present invention;

FIG. 7 shows a flow chart depicting a subprocess for generating an information packet in an origination unit in accordance with a preferred embodiment of the present invention;

FIG. 9 shows a flow chart depicting a subprocess for routing an information packet from an origination unit to a server in accordance with a preferred embodiment of the present invention;

FIG. 12 shows a flow chart depicting a subprocess for routing an information packet from a server to a destination unit in accordance with a preferred embodiment of the present invention;

DETAILED DESCRIPTION OF THE PREFERRED EMBODIMENTS

Figure 1:
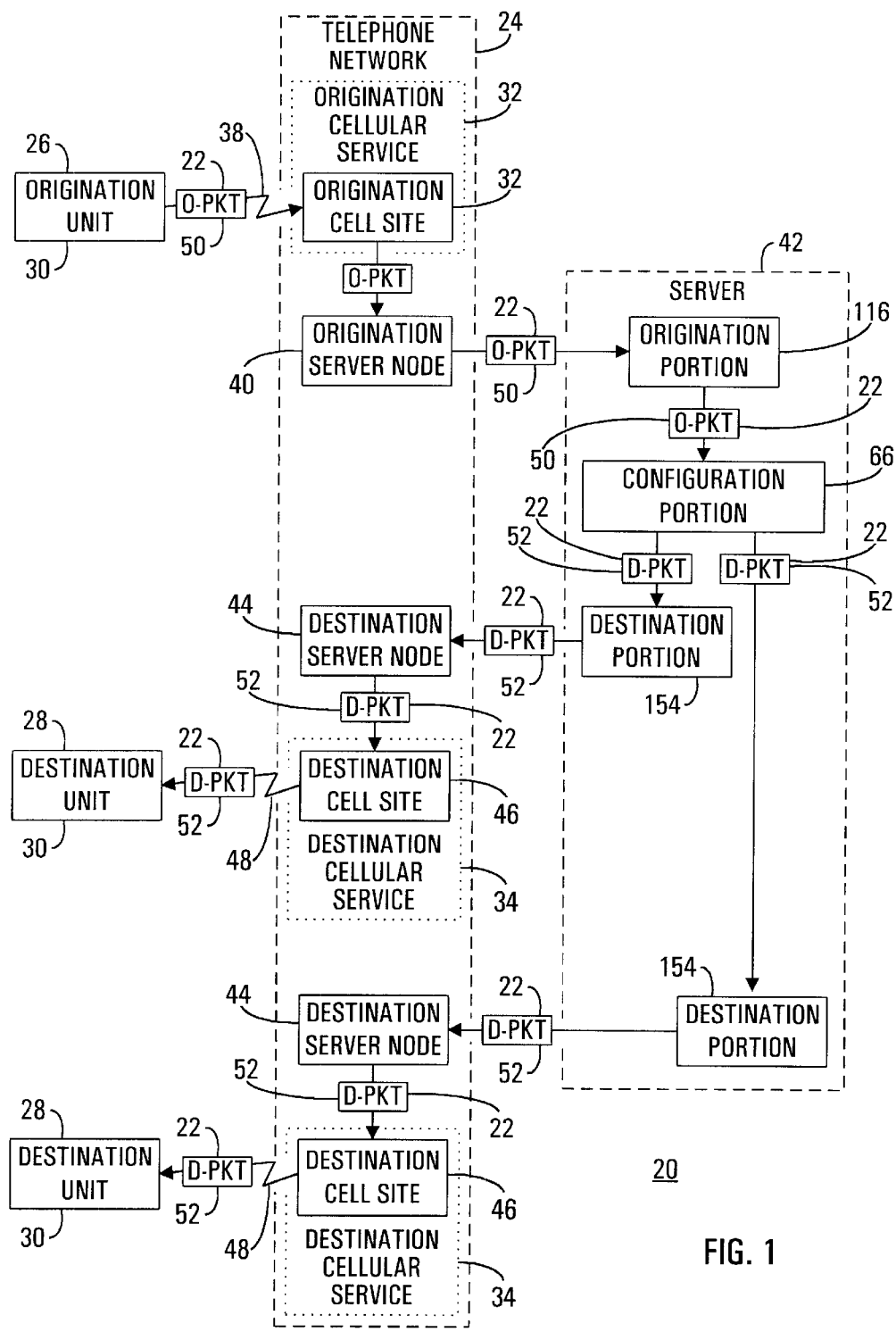
FIG. 1 shows a block diagram depicting a system for dispatching an information packet in accordance with a preferred embodiment of the present invention.

FIG. 1 shows a block diagram depicting a system 20 for dispatching an information packet 22 in accordance with a preferred embodiment of the present invention.

A telecommunication network 24 is used as a base for simplex information-packet dispatching system 20. For purposes of this discussion, telecommunication network 24 is taken to be at least portions of the worldwide global telecommunication network, encompassing both wireless (cellular) and wired portions thereof. Those skilled in the art will appreciate that different portions of network 24 operate in different manners, but that the manner of operation is irrelevant to this discussion, wherein any functional manner of operation is deemed to be appropriate. It will also be appreciated that, when system 20 serves a restricted area (e.g., a single city) network 24 may be taken to be a subset of the global telecommunications network, perhaps even a single cellular telephone system.

An origination unit 26 is configured to generate information packet 22. System 20 dispatches information packet 22 from origination unit 26 to a destination unit 28. The path information packet 22 takes between origination unit 26 and destination unit 28 is a simplex path. That is, information packet 22 proceeds only in a single direction, forward, and all links in that path need only be simplex (unidirectional) links.

Origination and destination units 26 and 28 are cellular telephones connected to network 24. Preferably, origination unit 26 is a digital cellular subscriber unit 30 of a cellular telephone service serving as an origination cellular service 32 of network 24. Similarly, destination unit 28 is a digital cellular subscriber unit 30 of a cellular telephone service serving as a destination cellular service 24 of network 24.

Those skilled in the art will appreciate that origination cellular service 32 and destination cellular service 34 may in actuality be the same cellular telephone service, and indeed may be the entirety of network 24, when system 20 is configured to serve a restricted area (e.g., a single city). Conversely, origination cellular service 32 and destination cellular service 34 may be displaced geographically, and may be functionally different (e.g., digital cellular telephone services in the United States and in France), in which case, origination unit 26 may be different in kind from destination unit 28, even though both are digital cellular subscriber units 30. Examples of differing digital cellular telephone systems are those meeting the well-known GSM, TDMA, CDMA, CDMA2000, and UMTS standards. Each information packet 22 is routed between origination/destination units 26/28 using a wireless non-circuit-switched service. Each cellular telephone is capable of providing three types of wireless service. Circuit-switched service is the normal full-duplex, high-bandwidth, high-power-consumption service used for conventional cellular telephony. Short-message service is a simplex, low-bandwidth, low-power consumption service used primarily to pass data to and from subscriber unit 30. Packet-switched service is a low-power-consumption service used primarily for the transmission of data packets. System 20 utilizes either short-message or packet-switched service for the simplex dispatching of information packets 22 containing voice (audio) frames, hence non-circuit-switched service.

Each information packet 22 is routed from origination unit 26 to an origination cell site 36 within network 24 via a wireless non-circuit-switched-service (NCSS) channel 38 of origination cellular service 32 of network 24. Information packet 22 is then routed through an origination server node 40 of network 24 to a server 42. Network 24 assigns NCSS (short-message-service or packet-switched-service) channels for this communication, which channels occupy much less spectrum and consume much less power than a circuit-switched-service channel.

After being processed within server 42, information packet 22 is routed through one or more destination server nodes 44 of network 24 and to a destination cell site 46 of one or more destination cellular services 34. From one or more destination cell sites 46, information packet 22 is routed to one or more destination units 28 via a wireless NCSS channel 48 of destination cellular service 34.

Those skilled in the art will appreciate that server nodes 40 and/or 44 may or may not be a part of cellular services 32 and/or 34, respectively. The locations of server nodes 40 and 44 and their connectivity to cellular services 32 and 34 are beyond the scope of the present discussion. For the purposes of the present invention, server nodes 40 and 44 have connectivity with cell sites 36 and 46, respectively, through network 24.

FIGS. 2 through 5 show a graphic representation of an origination packet 50 (FIG. 2), a destination packet 52 having a voice frame 54 (FIG. 3), a text frame 56 (FIG. 4), and both voice frame 54 and text frame 56 (FIG. 5) in accordance with a preferred embodiment of the present invention. The following discussion refers to FIGS. 1 through 5.

Origination unit 26 generates information packet 22 configured as origination packet 50, as seen in FIG. 2. In the preferred embodiment, origination packet 50 contains a packet header (HEADER) 58. Packet header 58 typically contains addressing and other information used by network 24 to properly process information packet 22. Most commonly, packet header 58 contains the address of server 42, thereby allowing network 24 to route origination packet 50 thereto. The specific contents of packet header 58 are dependent upon the requirements of origination cellular service 32 and network 24, and are therefore beyond the scope of this discussion.

Origination packet 50 also contains an origination address (O-ADDR) 60. Origination address 60 uniquely identifies origination unit 26. Origination address 60 is passed to server 42 for conversion purposes and is desirably passed to destination unit 28 for dispatch identification. Those skilled in the art will appreciate that, in some embodiments, origination address 60 may be incorporated into packet header 58. The use of alternative embodiments of origination address 60 does not depart from the spirit of the present invention.

In the preferred embodiment, origination packet 50 also contains a logical destination address (L-ADDR) 62. Logical destination address 62 identifies the specific one or more destination units 28 to which information packet 22 is to be dispatched. Any given destination address may be logical or physical. As used herein, a logical destination address is a code representing one or more destinations, e.g., "the current team leader," "the members of group 'B'," "all units in zone twelve," etc. A physical destination address is a unique representation of a specific destination. Telephone numbers are an example of physical addresses.

Since logical destination address 62 is logical rather than physical, it may be associated with any single destination unit 28 or any combination of destination units 28 within system 20. In this manner, group as well as individual dispatching may be carried out.

Those skilled in the art will appreciate that in some embodiments (e.g., where system 20 serves a small and/or fixed number of origination/destination units 26/28), logical destination address 62 may be replaced with a physical destination address 64 (discussed in more detail hereinafter). This eliminates the need for conversion (discussed hereinafter), but impairs the maximum size and flexibility of system 20. Use of physical destination address 64 in lieu of logical destination address 62 does not depart from the spirit of the present invention.

Origination packet 50 also contains voice frame 54. Voice frame 54 is generated by origination unit 26 in response to the voice of an originator (discussed in more detail hereinafter). This allows system 20 to be used in a manner analogous to a conventional PTT system.

Information packet 22 is converted from origination packet 50 to destination packet 52 by a configuration portion 66 of server 42. Destination unit 28 receives information packet 22 configured as destination packet 52. Destination packet 52 may assume any of several embodiments (FIGS. 3, 4, and 5) within system 20.

Like origination packet 50, destination packet 52 has an origination address (O-ADDR) 60 in the desired embodiment. Origination address 60 uniquely identifies origination unit 26, at least within the domain of units 26/28 served by server 42. By passing origination address 60 on to destination packet 52, destination unit 28 is made capable of reporting the origin of a dispatch to a recipient (see FIG. 14).

In destination packet 52, logical destination address 62 may be replaced by physical destination address 64. Physical destination address 64 uniquely identifies the destination unit 28 to which information packet 22 has been dispatched.

System 20 is capable of group dispatching, i.e., dispatching information packet 22 to a plurality of destination units 28. In a group dispatch, server 42 converts origination packet 50 into a plurality of destination packets 52, each having a unique physical destination address 64. Each unique physical destination address 64 is for one of the destination units 28 designated as a destination group (not shown) addressed by a single logical destination address 62 in origination packet 50.

Destination packet 52 also has a packet header 58. As discussed hereinbefore in conjunction with origination packet 50, destination packet header 58 contains a form of physical destination address 64 allowing network 24 to route destination packet 52 to destination unit 28.

Destination packet 52 may contain voice frame 54 (FIG. 3). Voice frame 54 as used in destination packet 52 may be identical to voice frame 54 as used in origination packet 50. In this case, server 42 retains origination voice frame 54 in position. Conversely, voice frame 54 as used in destination packet 52 may differ from voice frame 54 as used in origination packet 50. In this case, configuration portion 66 of server 42 converts voice frame 54 from a format (not shown) used in origination packet 50 to a format (not shown) desired for destination packet 52. Typically, a vocoder uses a recognized standard, e.g., one of the G.711, G.722, G.723, G.728, or G.729 standards. An example of such a conversion would be the use of an appropriate devocoder to extract a voice signal (not shown) from voice frame 54 encoded in the format used by origination packet 50, then the use of an appropriate vocoder to encode the voice signal into voice frame 54 in the format desired for destination packet 52.

Destination packet 52 may contain text frame 56. In this case, server 42 converts voice frame 54 of origination packet 50 into text frame 56 desired for destination packet 52. The use of text frame 56 allows system 20 to implement silent dispatching. An example of such a conversion would be the use of a devocoder to extract a voice signal (not shown) from voice frame 54, the use of a speech-to-text converter (not shown) to create a text signal (not shown), and the encoding of the text signal into text frame 56.

Destination packet 52 may contain both voice frame 54 and text frame 56. In this case, proceeding as discussed hereinbefore, server 42 produces frames 54 and 56 as desired for destination packet 52.

Those skilled in the art will appreciate that, during activation and at selected other times, each unit 26/28 briefly communicates with server 42 through network 24. Activation occurs when a unit 26/28 is placed in service for use in system 20. Other times can occur when users of system 20 wish to change programming of units 26/28 or preferences programmed for unit 26/28. During this brief communication, various parameters are downloaded to and uploaded from unit 26/28. Among those parameters downloaded are data and routines required for unit 26/28 to perform as origination/destination unit 26/28, and among those parameters uploaded are data indicating the voice versus text preferences of the unit 26/28. The details of such communications are a function of the programs used to implement system 20 and, as such, are beyond the scope of this discussion.

Figure 6:
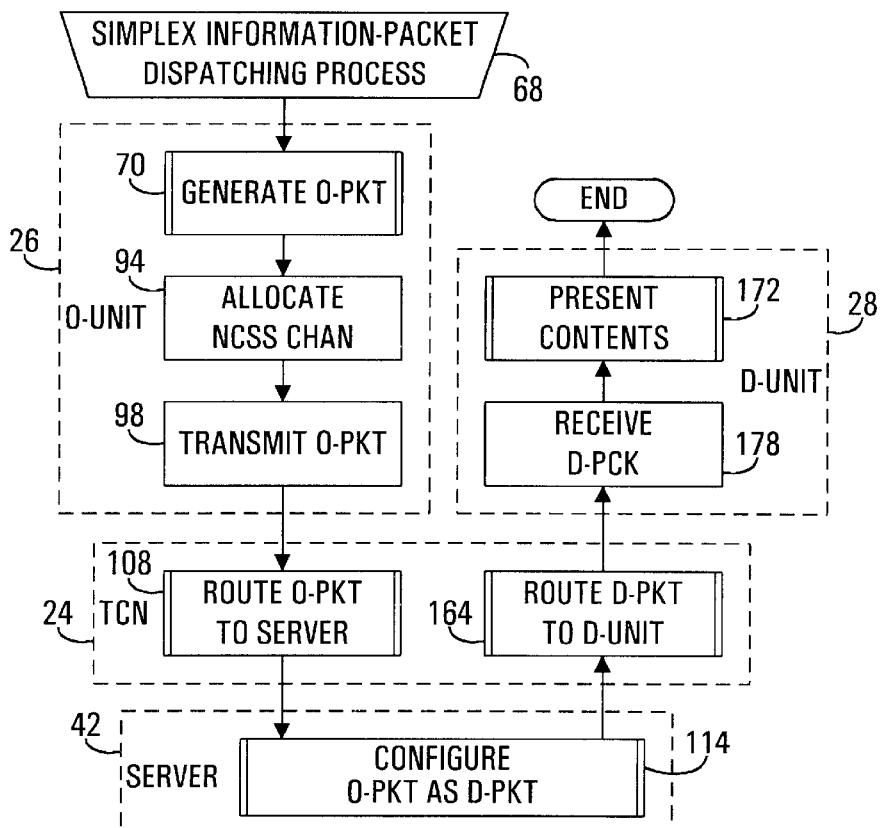
FIG. 6 shows a flow chart depicting a process for dispatching a simplex information packet in accordance with a preferred embodiment of the present invention.
Figure 8:
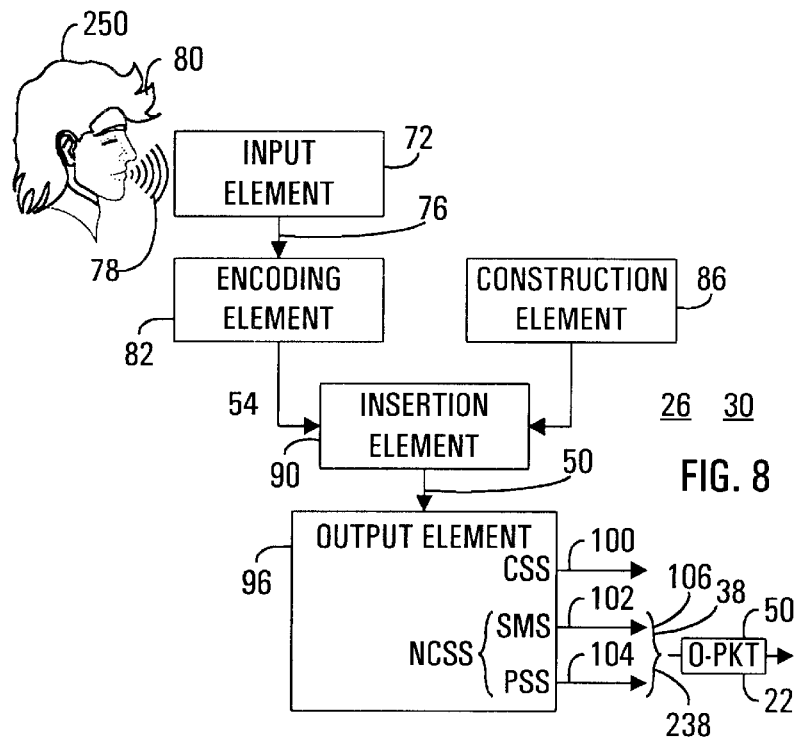
FIG. 8 shows a block diagram depicting an origination unit of an information-packet dispatching system in accordance with a preferred embodiment of the present invention.

FIG. 6 shows a flow chart depicting a process 68 for dispatching simplex information packet 22 in accordance with a preferred embodiment of the present invention. FIG. 7 shows a flow chart depicting a subprocess 70 for generating information packet 22 in origination unit 26, and FIG. 8 shows a block diagram depicting origination unit 26. The following discussion refers to FIGS. 1, 6, 7, and 8.

System 20 uses process 68 to allow components of cellular telephone services 32 and 34, and subscriber units 30, to work with server 42 and provide simplex information-packet dispatching. A given digital cellular subscriber unit 30 (FIGS. 1 and 8) serves as origination unit 26 and performs generating subprocess 70 (FIGS. 6 and 7).

Within an input element 72 (FIG. 8), a producing task 74 (FIG. 7) of subprocess 70 produces an analog audio (voice) signal (V-SIG) 76 from a voice (audible sound) 78 of an originator 80. Input element 72 is typically made up of a microphone and related circuitry.

Within an encoding element 82 (FIG. 8), an encoding task 84 (FIG. 7) encodes voice signal (V-SIG) 76 into voice (audio) frame. (V-FRM) 54. Encoding element 82 is typically a vocoder circuit or other circuitry configured to render analog voice signal 76 into digital voice frame 54 (FIG. 2).

Within a construction element 86 (FIG. 8), a constructing task 88 (FIG. 7) constructs origination packet (O-PKT) 50 (FIG. 2). That is, constructing task 88 forms header 58, establishes origination and destination addresses 60 and 62, and prepares origination packet 50 for the insertion of voice frame 54.

Within an insertion element 90 (FIG. 8), an enclosing task 92 (FIG. 7) then encloses voice frame (V-FRM) 54 within origination packet (O-PKT) 50. This completes subprocess 70, and control is returned to process 68 (FIG. 6).

Those skilled in the art will appreciate that the above scenario for tasks 84, 88, and 92 is exemplary only, and that in practice a single processing element (e.g., a digital signal processor) may be used to perform all three tasks. The use of alternative hardware than that described herein does not depart from the spirit of the present invention.

Once origination packet 50 has been completed, an allocating task 94 (FIG. 6), carried out through the cooperation of origination unit 26 and network 24, briefly allocates a traffic channel 38 for use by a non-circuit-switched service of system 20. Task 94 involves a brief communication between originating unit 26 and originating cellular service 32 over a control channel (not shown), which results in the brief allocation of traffic channel 38 by cellular service 32 for NCSS purposes.

Within an output element 96 (FIG. 8), a transmitting task 98 then transmits origination packet (O-PKT) 50 to origination cell site 36. At the same time, cell site 36 receives origination packet 50, and the allocated channel is immediately de-allocated, whereupon it becomes available for other uses by origination cellular service 34.

It may be seen in FIG. 8 that origination unit 26 has three services with which to communicate with origination cell site 36. The first is a circuit-switched service 100. This is a fully duplex service used for conventional cellular communication. The second is a short-message service 102 and the third is a packet-switched service 104. Short-message service 102 and packet-switched service 104 are each used for data (non-voice) communication by conventional cellular services. Short-message service 102 and packet-switched service 104 are non-circuit-switched services 106. System 20 uses one of non-circuit-switched services 106 (either one) for voice dispatching.

NCSS channel 38 is not allocated and origination packet 50 is not transmitted until after an inception of information packet 22. That is, origination unit 26 begins the construction of origination packet 50, and is then free to allocate NCSS channel 38 for transmission of the still-under-construction information packet 22. This "windowing" ability significantly reduces the overall time between the inception of origination-unit construction and the termination of origination-unit transmission.

After transmission, channel 38 is de-allocated. In this way, the use of non-circuit-switched services 106 serves to reduce the allocation and transmission time. Those skilled in the art will appreciate that non-circuit-switched services 106 use considerably less bandwidth than circuit-switched services 100. This, coupled with the significant reduction in allocation and transmission time, produces a significant reduction in the overall expenditure of system resources in network 24. This in turn produces a significant reduction in operating expenses.

FIG. 9 shows a flow chart depicting a subprocess 108 for routing information packet 22 from origination unit 26 to server 42 in accordance with a preferred embodiment of the present invention. The following discussion refers to FIGS. 1, 6, and 9.

Network 24 (FIG. 1) performs routing subprocess 108 (FIGS. 6 and 9) to route origination packet (O-PKT) 50 from origination unit 26 to server 42.

A routing task 110 (FIG. 9) routes origination packet (O-PKT) 50 from origination unit (O-UNIT) 26 to origination cell site (O-SITE) 36 of origination cellular service 32 via origination NCSS channel 38 (FIG. 1). NCSS channel 38 is briefly allocated for transmission of origination packet 50 then de-allocated.

Another routing task 112 (FIG. 9) then routes origination packet (O-PKT) 50 from origination cell site (O-SITE) 36 through origination server node 40 to server 42. This routing may take any convenient path and may traverse a packet-switched network, such as the Internet. This completes subprocess 108 and control is returned to process 68 (FIG. 6).

Those skilled in the art will appreciate that server node 40 need not be a part of cellular service 32. Server node 40 need only be accessible to cellular service 32 to fulfill all required functions, i.e., to interface server 42 with network 24.

Figure 10:
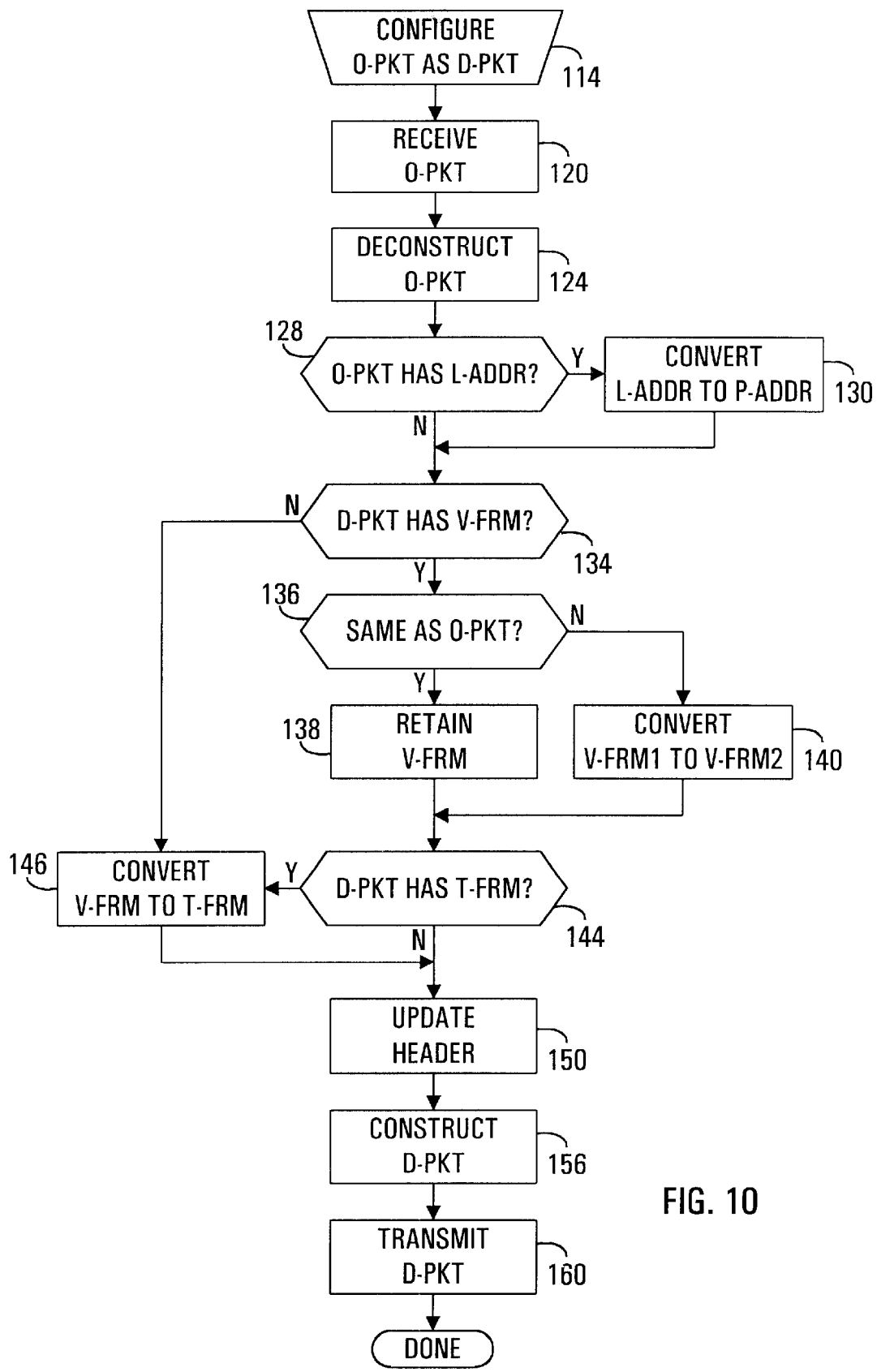
FIG. 10 shows a flow chart depicting a subprocess for converting an information packet from an origination packet to a destination packet in accordance with a preferred embodiment of the present invention.
Figure 11:
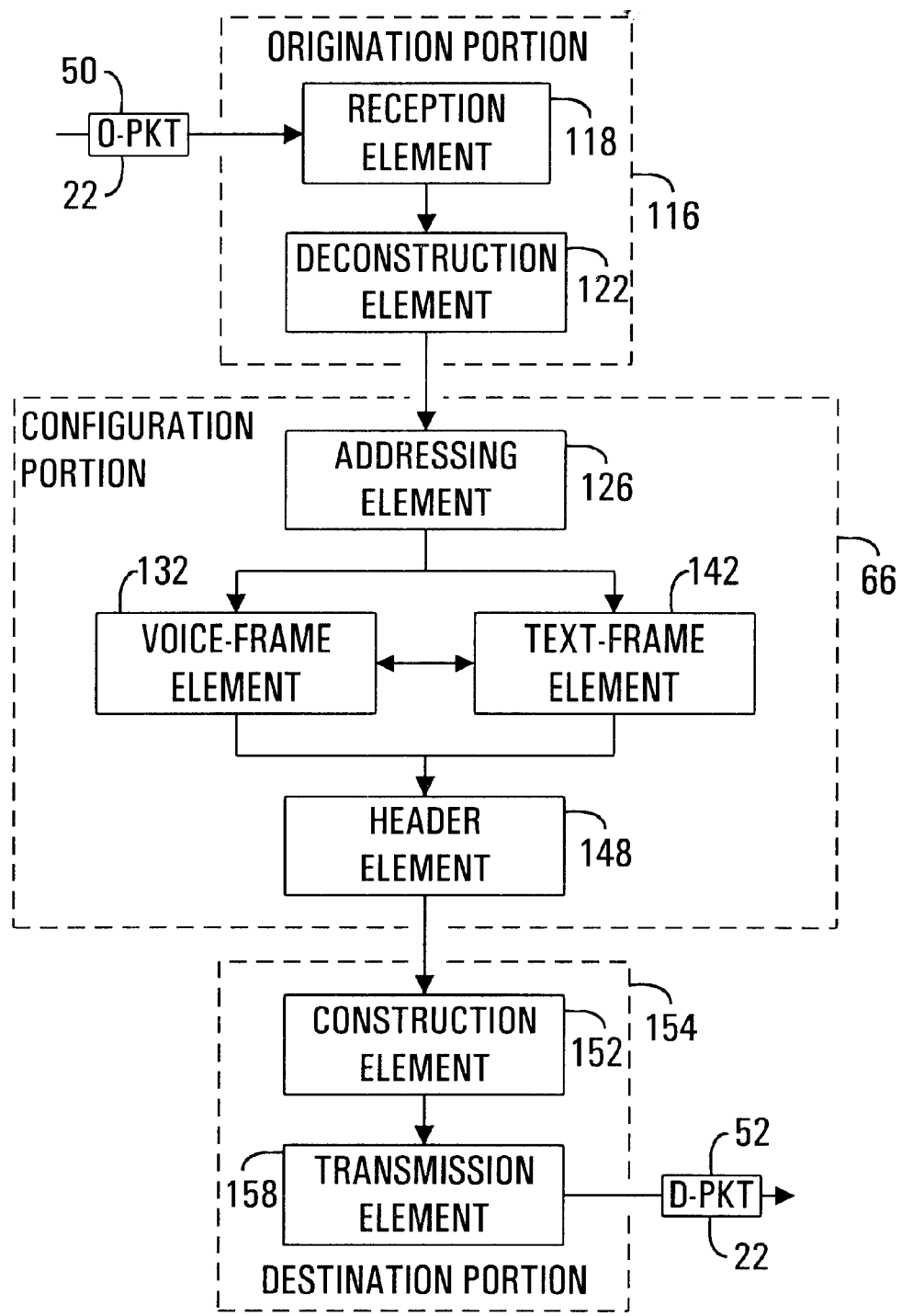
FIG. 11 shows a block diagram depicting a server of an information-packet dispatching system in accordance with a preferred embodiment of the present invention.

FIG. 10 shows a flow chart depicting a subprocess 114 for configuring information packet 22 from origination packet (O-PKT) 50 to destination packet (D-PKT) 52. FIG. 11 shows a block diagram depicting server 42 of information-packet dispatching system 20 in accordance with a preferred embodiment of the present invention. The following discussion refers to FIGS. 1, 10 and 11.

Following subprocess 108, origination packet 50 has arrived at an origination portion 116 of server 42 (FIGS. 1 and 11). Process 68 then executes configuring subprocess 114 (FIGS. 6 and 10) to configure origination packet (O-PKT) 50 as destination packet (D-PKT) 52.

Within a reception element 118 (FIG. 11) in origination portion 116 of server 42, a receiving task 120 (FIG. 10) receives origination packet (O-PKT) 50 from network 24.

Within a deconstructing element 122 (FIG. 11) in origination portion 116 of server 42, a deconstructing task 124 (FIG. 10) then deconstructs origination packet (O-PKT) 50. Origination packet 50 has now been "broken" into its component parts for analysis, conversion, and configuration.

Within an addressing element 126 (FIG. 11) of configuration portion 66 of server 42, an addressing query task 128 (FIG. 10) determines if origination packet (O-PKT) 50 contains a logical destination address (L-ADDR) 62 (FIG. 2).

If query task 128 determines that origination packet 50 contains a logical destination address 62, then a converting task 130 (FIG. 10) converts logical destination address (L-ADDR) 62 into a physical destination address (P-ADDR) 64. This conversion may be performed through the use of a table look-up operation or other scheme. Moreover, if logical destination address 62 specifies a group, then logical destination address 62 is converted into a plurality of physical destination addresses 64, where each physical destination address 64 is used in a unique destination packet 52 directed to a single destination unit 28 of the group.

Within a voice-frame element 132 (FIG. 11) following task 130 or if query task 128 determines that origination packet 50 contains a physical destination address 64, a voice-frame query task 134 (FIG. 10) determines if destination packet (D-PKT) 52 is to incorporate voice frame (V-FRM) 54.

If query task 134 determines that destination packet 52 is to contain voice frame 54, then another voice-frame query task 136 (FIG. 10) determines if destination packet (D-PKT) 52 is to have the same voice frame (V-FRM) 54 as origination packet (O-PKT) 50. That is, is the format of the origination voice frame 54 the same as the desired format of the destination voice frame 54.

If query task 136 determines that destination packet 52 is to have the same voice frame 54 as origination packet 50, then a retaining task 138 (FIG. 10) retains voice frame (V-FRM) 54 used in origination packet 50. That is, the origination voice frame 54 is passed to destination packet 52.

If query task 136 determines that destination packet 52 is not to have the same voice frame 54 as origination packet 50, then a converting task 140 (FIG. 10) converts voice frame 54 from the format used in origination packet 50 to the format to be used for destination packet 52. In a typical scenario, an appropriate devocoder decodes the origination voice frame 54 to reproduce voice signal 76. An appropriate vocoder then encodes voice signal 76 into a new voice frame 54 having the desired format.

Within a text-frame element 142 (FIG. 11) following tasks 138 or 140, a text-frame query task 144 (FIG. 10) determines if destination packet (D-PKT) 52 is to contain a text frame (T-FRM) 56 (FIGS. 3 and 5).

Figure 14:
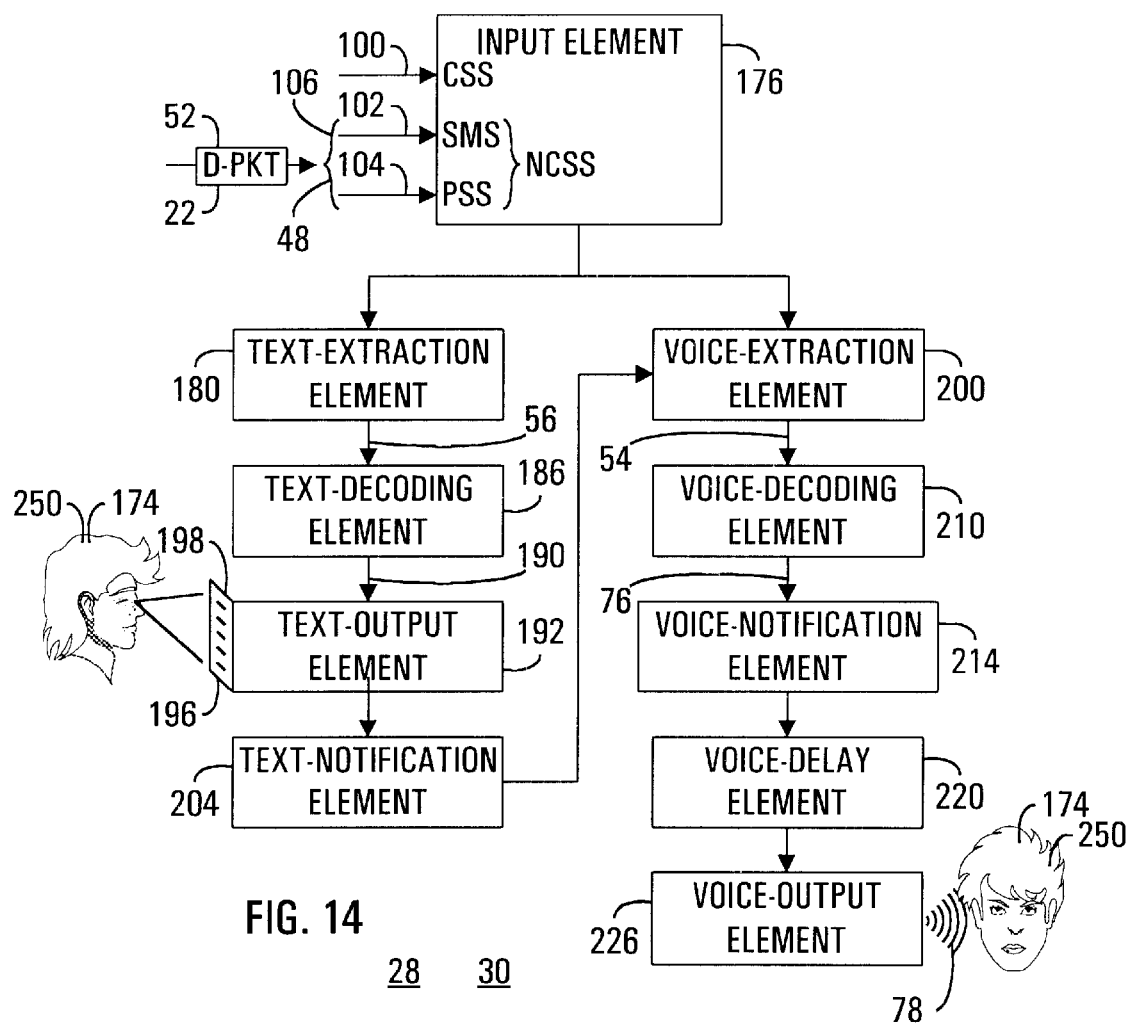
FIG. 14 shows a block diagram depicting a destination unit of an information-packet dispatching system in accordance with a preferred embodiment of the present invention.

If query task 134 determines that destination packet 52 is not to contain voice frame 54 or if query task 144 determines that destination packet 52 is to have text frame 56, then a converting task 146 (FIG. 10) converts voice frame (V-FRM) 54 into text frame (T-FRM) 56. This may be accomplished by using an appropriate devocoder to decode the origination voice frame 54 and reproduce voice signal 76. A voice-to-text conversion routine may then be used to convert voice signal 76 into text signal 190 (FIG. 14). An encoder may then encode text signal 190 into text frame 56.

Within a header element 148 (FIG. 11) following task 146 or if query task 144 determines that destination packet (D-PKT) 52 is not to have text frame (T-FRM) 56, then an updating task 150 (FIG. 10) updates packet header 58 (FIGS. 3, 4, and 5) to contain appropriate addressing information for network 24.

Within a construction element 152 in a destination portion 154 of server 42, a constructing task 156 (FIG. 10) constructs destination packet (D-PKT) 52. This may be accomplish by concatenating packet header 58, origination address 60, physical destination address 64, and voice frame 54 and/or text frame 56 to form destination packet 52.

Within a transmission element 158 (FIG. 11) in destination portion 154 of server 42, a transmitting task 160 then transmits destination packet (D-PKT) 52 to network 24. This completes subprocess 114 and control is returned to process 68 (FIG. 6).

Those skilled in the art will appreciate that server 42 is depicted in FIGS. 1 and 11 as having multiple portions, i.e., origination portion 116, configuration portion 66, and destination portion 154. Origination portion 116 is that portion of server 42 primarily concerned with communicating with origination unit 26. Configuration portion 66 is that portion of server 42 primarily concerned with the conversion of origination packet 50 into at least one destination packet 52. Destination portion 154 is that portion of server 42 primarily concerned with communicating with destination unit 28.

For group dispatches, there exists more than one destination unit 26 (see FIG. 1). Those skilled in the art will appreciate that, in this case, components of configuration portion 66 and the entirety of destination portion 154 would be replicated for each destination unit 28.

Those skilled in the art will also appreciate that server 42 may be a single entity (e.g., a computer) residing in a single locale. In this case, portions 116, 66, and 154 of server 42 are components of that single entity, and may be implemented primarily in software. Conversely, server 42 may be distributed, i.e., server 42 may be a plurality of entities residing in a plurality of locales. In this case, portions 116, 66, and 154 of server 42 may be individual entities interconnected into a single whole. The method of interconnect is preferably a packet-switched network 162 (e.g., the Internet). Variations in the configuration and interconnections of server 42 do not depart from the spirit of the present invention.

FIG. 12 shows a flow chart depicting a subprocess 164 for routing information packet 22 from server 42 to destination unit 28 in accordance with a preferred embodiment of the present invention. The following discussion refers to FIGS. 1, 6, and 12.

Network 24 (FIG. 1) performs subprocess 164 (FIGS. 6 and 12) to route destination packet (D-PKT) 52 from server 42 to destination unit (D-UNIT) 28.

A routing task 166 (FIG. 12) routes destination packet 52 from server 42 through destination server node 44 and to destination cell site (D-SITE) 46. This routing may take any convenient path and may traverse a packet-switched network, such as the Internet.

An allocating task 168 (FIG. 12) then briefly allocates an NCSS traffic channel 48 for use by destination unit 28. Task 168 involves a brief communication between destination cellular service 34 and destination unit 28 over a control channel (not shown), which results in the brief allocation of traffic channel 48 by cellular service 34.

Another routing task 170 (FIG. 12) then routes destination packet (D-PKT) 52 from destination cell site (D-SITE) 46 to destination unit (D-UNIT) 28 via destination NCSS channel 48. This completes subprocess 164 and control is returned to process 68 (FIG. 6). NCSS channel 48 is briefly allocated for transmission of destination packet 52. In accordance with conventional non-circuit-switched services, NCSS channel 48 is de-allocated as soon as destination packet 52 has been received by destination unit 28, whereupon NCSS channel 48 is available for other uses by network 24.

Those skilled in the art will appreciate that server node 44 need not be a part of cellular service 34. Server node 44 need only be accessible to cellular service 34 to fulfill all required functions, i.e., to interface server 42 with network 24.

NCSS channel 48 may be allocated at the inception of the receipt of destination packet 52 at destination cell site 46. This allows a windowing function similar to that described hereinbefore in conjunction with origination packet 50 and origination cell site 36. This is not a requirement, however, and the allocation of NCSS channel 48 may be carried out after the reception of destination packet 52 at cell site 46 has been completed. This serves to reduce the overall allocation and transmission time.

Those skilled in the art will appreciate that various combinations of the tasks performed within server 42 may be performed by a processing element and/or various tables. The use of such a processing element and/or such tables to perform any of such tasks does not depart from the spirit of the present invention.

Figure 13:
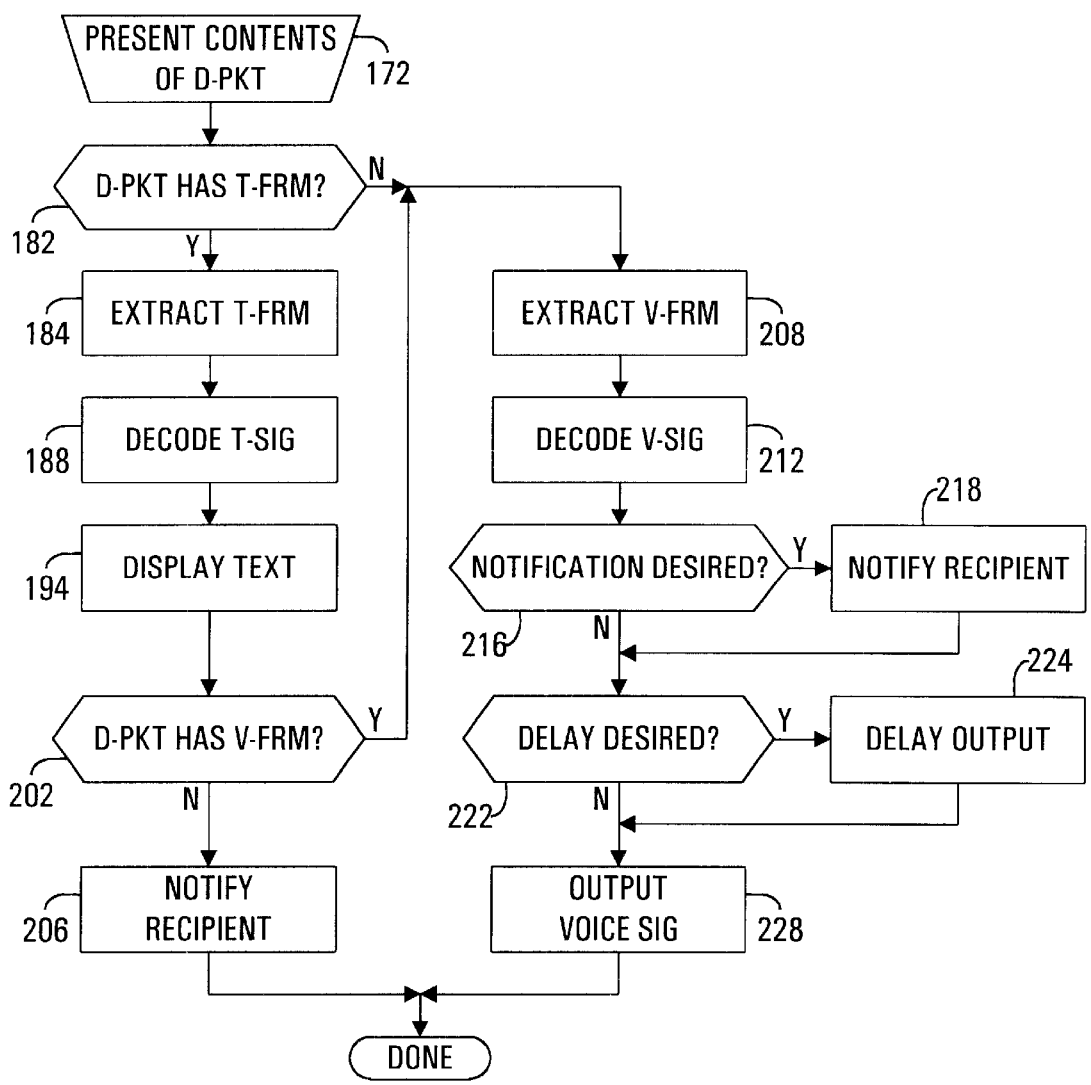
FIG. 13 shows a flow chart depicting a subprocess for presenting the contents of an information packet to a recipient in accordance with a preferred embodiment of the present invention.

FIG. 13 shows a flow chart depicting a subprocess 172 for presenting the contents of destination packet (D-PKT) 52 to a recipient 174. FIG. 14 shows a block diagram depicting destination unit 28 of information-packet dispatching system 20 in accordance with a preferred embodiment of the present invention. The following discussion refers to FIGS. 1, 6, 13, and 14.

Following subprocess 164, a destination packet 52 has arrived at each destination unit 28 (FIGS. 1 and 14) associated with logical destination address 62 in origination packet 50. The following discussion assumes the singular in that those skilled in the art will appreciate that all such destination units 28 are essentially functionally identical.

Within an input element 176 (FIG. 14), a receiving task 178 (FIG. 6) receives destination packet (D-PKT) 52 from network 24 via NCSS channel 48.

Process 68 then executes subprocess 172 (FIGS. 6 and 13) to present the contents of destination packet (D-PKT) 52 to recipient 174 (FIG. 14).

Within a text-extraction element 180 (FIG. 14), a text-frame query task 182 (FIG. 13) determines if destination packet (D-PKT) 52 contains text frame (T-FRM) 56.

If query task 182 determines that destination packet 52 contains text frame 56, then an extracting task 184 extracts text frame (T-FRM) 56 from destination packet 52.

Within a text-decoding element 186 (FIG. 14), a decoding task 188 (FIG. 13) decodes text frame (T-FRM) 56 into text signal 190.

Within a text-output element 192 (FIG. 14), a displaying task 194 displays text signal 190 as text 196 upon a display 198 for recipient 174. Conventional user controls (not shown) may be implemented to control operation of display 198 Following task 194 and within a voice-extraction element 200 (FIG. 14), a voice-frame query task 202 determines if destination packet (D-PKT) 52 contains voice frame (V-FRM) 54.

If query task 202 determines that destination packet 52 does not contain voice frame 54, then in a notification element 204 (FIG. 14) a notifying task 206 (FIG. 13) notifies recipient 174 that a text dispatch has been received. This notification may be in the form of a brief audible alarm, vibration, or the like.

If query task 182 determines that destination packet 52 does not contain text frame 56 or query task 202 determines that destination packet 52 contains voice frame 54, then in voice-extraction element 200 (FIG. 14) an extracting task 208 (FIG. 13) extracts voice frame (V-FRM) 54 from destination packet 52.

Within a voice-decoding element 210 (FIG. 14), a decoding task 212 (FIG. 13) decodes voice frame (V-FRM) 54 into voice signal (V-SIG) 76.

In notification element 214 (FIG. 14), a notification query task 216 (FIG. 13) determines if recipient 174 prefers to be notified of the receipt of destination packet 52 prior to the output thereof. Desirably, recipient 174 may program destination unit 28 to specify this preference.

If query task 216 determines that recipient 174 prefers to be notified, then a notifying task 218 (FIG. 13) notifies recipient 174 that a voice dispatch has been received. This notification may be in the form of a brief audible alarm, vibration, or the like.

Following task 218 or if query task 216 determines that recipient does not wish to be notified of the reception of a voice dispatch, then within a delay element 220 (FIG. 14) a delay query task 222 (FIG. 13) determines if recipient 174 prefers the outputting of voice dispatches delayed until requested. Desirably, recipient 174 may program destination unit 28 to specify this preference.

If query task 222 determines that recipient 174 prefers dispatch output delayed, then a delaying task 224 (FIG. 13) delays dispatch output until requested by recipient 174. This may be useful when recipient 174 cannot be disturbed by the outputting of a voice dispatch.

Following task 224 or if query task 222 has determined that recipient does not wish dispatch output to be delayed, within a voice-output element 226 an outputting task 228 outputs voice signal 76 as voice (audible sound) 78 for recipient 174.

Following task 206 or task 228, subprocess 172 and process 68 are complete.

Those skilled in the art will appreciate that any combination of tasks 182, 184, 188, 194, 202, 206, 208, 212, 216, 218, 222, 224, and 228 may be implemented with a single processing element (e.g., a digital signal processor). The use of such a processing element does not depart from the spirit of the present invention.

Those skilled in the art will appreciate that system 20 is capable of dispatching a single voice frame 54 to a multiple of destination units 28. In such a case, certain tasks and elements described hereinbefore will be replicated accordingly in a manner obvious to one so skilled. The use of multiple destination units 28 does not depart from the spirit of the present invention.

In summary, the present invention teaches an improved system 20 and process 68 for dispatching information packets 22 is provided. Simplex PTT communication system 20 utilizes conventional cellular telephone services 32 and 34 in a telecommunication network 24. System 20 allows inter-cellular-service communication without the need of specialized equipment. By using cellular services 32 and 34, a plurality of transmission points in a given area is provided, thus minimizing shadowing. System 20 permits selective dispatching without specialized equipment. System 20 provides voice-to-text conversion for silent reception of a voice dispatch. System 20, being digital, inhibits eavesdropping and allows for easy data encryption. Since any unit is a digital cellular subscriber unit 30 of cellular service 32/34, any unit may be used to directly access cellular service 32/34 in a conventional cellular manner, i.e., may place or receive a traditional cellular telephone call. The functionality of system 20 may be added to any given subscriber unit 30 while retaining full cell-phone functionality. Conversely, the functionality of system 20 may be added to any given subscriber unit 30 in lieu of some or all cell-phone functionality. It is desirable, however, that 911 emergency-call functionality be maintained.

Figure 15:
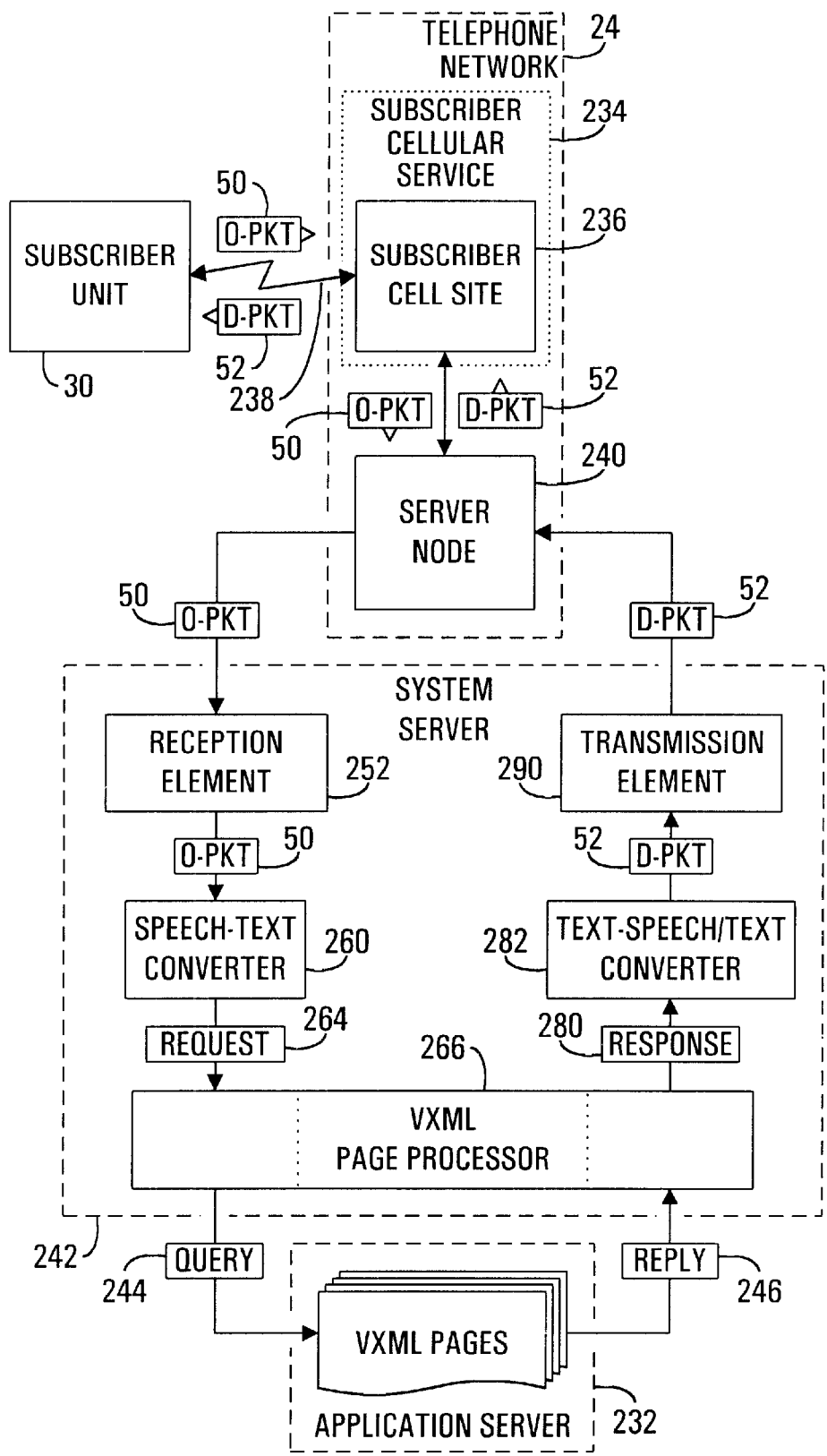
FIG. 15 shows a block diagram depicting a system for voice browsing in accordance with an alternative preferred embodiment of the present invention.

FIG. 15 shows a block diagram depicting a system 230 for voice browsing in accordance with an alternative preferred (voice-browsing) embodiment of the present invention. The following discussion refers to FIG. 15.

Those skilled in the art will appreciate that the methodologies described hereinbefore are readily applicable to alternative embodiments. FIG. 15 depicts such an alternative embodiment wherein the present invention is implemented as a voice browser, i.e., as an instrument to obtain, peruse, or query relevant information under voice control, e.g., from a VXML Internet page site. With such a browser, a subscriber need merely activate a subscriber unit and verbally request the desired information.

Telecommunication network 24 is used as a base for simplex voice-browsing system 230. Again, telecommunication network 24 is taken to be at least portions of the worldwide global telecommunication network, encompassing both wireless (cellular) and wired portions thereof.

Simplex voice-browsing system 230 is an example of a single-subscriber function of the present invention. That is origination unit 26 (FIG. 1) and destination unit 28 (FIG. 1) are combined into a single digital cellular subscriber unit 30 (FIG. 15). Subscriber unit 30 is configured to generate origination packet 50 (FIG. 2). System 230 dispatches origination packet 50 from subscriber unit 30 to an application server 232. Subscriber unit 30 is preferably a digital cellular subscriber unit of a subscriber cellular service 32 of network 24.

Each origination packet 50 is routed from subscriber unit 30 to a subscriber cell site 236 within network 24 via a wireless non-circuit-switched service (NCSS) channel 238 of subscriber cellular service 234 of network 24. Origination packet 50 is then routed through a server node 240 of network 24 to a system server 242. Network 24 assigns NCSS (SMS or PSS) channels for this communication, which channels occupy much less spectrum and consume much less power than a CSS channel.

System server 242 produces a voice-extensible markup-language (VXML) query 244 in response to origination packet 50. VXML query 244 is then passed to application server 232.

Application server 232 responds to VXML query 244 by passing a VXML reply 246 back to system server 242. System server 242 produces a destination packet 52 (FIGS. 3, 4, and 5) in response to VXML reply 246.

After being produced within system server 242, destination packet 52 is routed through server node 240 of network 24 and to subscriber cell site 236 of subscriber cellular service 234. Destination packet 52 is then routed to subscriber units 30 via wireless NCSS channel 238 of subscriber cellular service 234.

Those skilled in the art will appreciate that the paths taken by origination packet 50 and destination packet 52 are simplex paths. That is, information proceeds only in a single direction at one time, forward, and all links in those paths need only be simplex (unidirectional) links.

Those skilled in the art will also appreciate that server node 240 may or may not be a part of subscriber cellular service 32. The location of server node 240 and its connectivity to cellular service 232 are beyond the scope of the present discussion. For the purposes of the present invention, server node 240 has connectivity with subscriber cell site 236 through network 24.

FIGS. 2 through 5 show a graphic representation of an origination packet 50 (FIG. 2), a destination packet 52 having a voice frame 54 (FIG. 3), a text frame 56 (FIG. 4), and both voice frame 54 and text frame 56 (FIG. 5) in accordance with a preferred embodiment of the present invention. The following discussion refers to FIGS. 15 and 2 through 5.

Subscriber unit 30 generates origination packet 50 as seen in FIG. 2. In the preferred embodiments, origination packet 50 contains packet header (HEADER) 58. As discussed hereinbefore, packet header 58 typically contains addressing and other information used by network 24 to properly process information packet 22.

Origination packet 50 also contains origination address (O-ADDR) 60. Origination address 60 uniquely identifies origination unit 26. Origination address 60 is desirably passed through system server 242 to application server 232 identification purposes.

Origination packet 50 also contains a logical destination address (L-ADDR) 62. In the voice-browser embodiment, logical destination address 62 identifies the specific application server 232 to which origination packet 50 is to be dispatched. Logical destination address is typically a unique code representing the specific application server.

Origination packet 50 also contains voice frame 54. Voice frame 54 is generated by origination unit 26 in response to the voice of originator 80.

Destination packet 52, returning to subscriber unit 30 in response to origination packet 50, may assume any of several embodiments (FIGS. 3, 4, and 5) within system 230.

Like origination packet 50, destination packet 52 has an origination address (O-ADDR) 60 in the desired embodiment. Origination address 60 uniquely identifies subscriber unit 30 within the domain of units 30 served by system server 242.

In the voice-browsing embodiment, physical destination address 64 serves no critical function and may be omitted.

Destination packet 52 also has a packet header 58. As discussed hereinbefore in conjunction with origination packet 50, destination packet header 58 contains a form of physical destination address 64 allowing network 24 to route destination packet 52 to subscriber unit 30.

Destination packet 52 may contain voice frame 54 (FIG. 3), text frame 56, or both voice frame 54 and text frame 56, as discussed hereinbefore.

Figure 16:
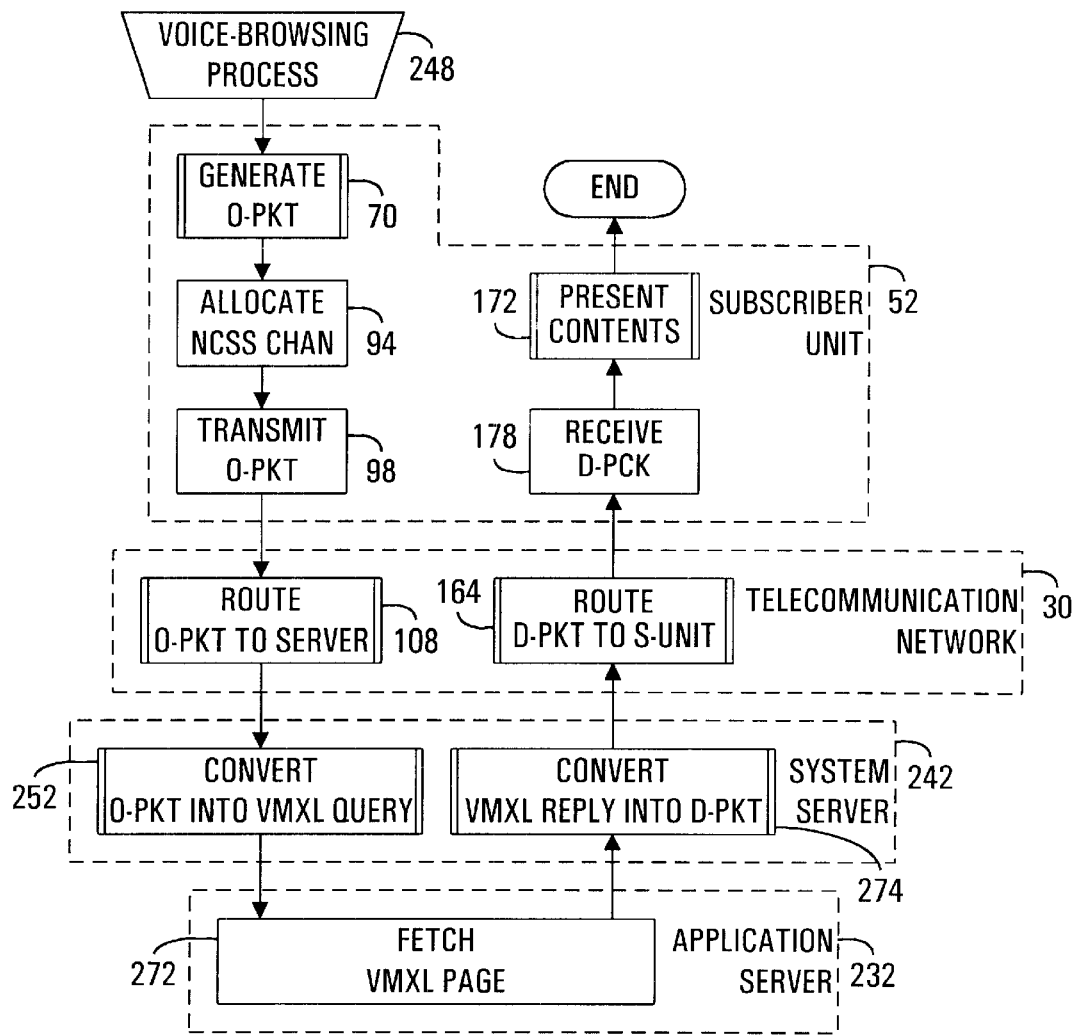
FIG. 16 shows a flow chart depicting a process for voice browsing in accordance with an alternative preferred embodiment of the present invention.

FIG. 16 shows a flow chart depicting a process 248 for voice browsing in accordance with an alternative (voice-browsing) preferred embodiment of the present invention. FIG. 7 shows a flow chart depicting a subprocess 70 for generating origination packet 50 in subscriber unit 30, and FIG. 8 shows a block diagram depicting packet-origination elements of subscriber unit 30. The following discussion refers to FIGS. 15, 16, 7, and 8.

System 230 uses process 248 to allow components of cellular telephone service 32 and subscriber unit 30 to work with system server 242 to provide voice browsing. A given digital cellular subscriber unit 30 (FIGS. 15 and 8) performs generating subprocess 70 (FIGS. 16 and 7).

Within input element 72 (FIG. 8), producing task 74 (FIG. 7) of subprocess 70 produces analog voice signal (V-SIG) 76 from voice (audible sound) 78 of subscriber 80. Within encoding element 82 (FIG. 8), encoding task 84 (FIG. 7) encodes voice signal (V-SIG) 76 into voice frame (V-FRM) 54. Within construction element 86 (FIG. 8), constructing task 88 (FIG. 7) constructs origination packet (O-PKT) 50 (FIG. 2). Within insertion element 90 (FIG. 8), enclosing task 92 (FIG. 7) then encloses voice frame (V-FRM) 54 within origination packet (O-PKT) 50. This completes subprocess 70, and control is returned to process 248 (FIG. 16).

Once origination packet 50 has been created, allocating task 94 (FIG. 16) briefly allocates traffic channel 238 for use by NCSS service 106 of system 20.

Within an output element 96 (FIG. 8), transmitting task 98 then transmits origination packet (O-PKT) 50 to subscriber cell site 236. At the same time, cell site 236 receives origination packet 50.

After transmission, allocated channel 238 is immediately de-allocated, whereupon it becomes available for other uses by subscriber cellular service 234. In this way, the use of non-circuit-switched services 106 serves to reduce the allocation and transmission time. Those skilled in the art will appreciate that non-circuit-switched services 106 (i.e., small-message service 102 and packet-switched service 104) use considerably less bandwidth than circuit-switched service 100. This, coupled with the significant reduction in allocation and transmission time, produces a significant reduction in the overall expenditure of system resources in network 24. This in turn produces a significant reduction in operating expenses.

FIG. 9 shows a flow chart depicting a subprocess 108 for routing information packet 22 from origination unit 26 to server 42 in accordance with a preferred embodiment of the present invention. The following discussion refers to FIGS. 15, 16, and 9.

Network 24 (FIG. 15) performs routing subprocess 108 (FIGS. 16 and 9) to route origination packet (O-PKT) 50 from subscriber unit 30 to system server 242.

A routing task 110 (FIG. 9) routes origination packet 50 from subscriber unit 30 to subscriber cell site 236 of subscriber cellular service 234 via NCSS channel 238 (FIG. 15). NCSS channel 238 is briefly allocated for transmission of origination packet 50 then de-allocated. Another routing task 112 (FIG. 9) then routes origination packet 50 from subscriber cell site 236 through server node 240 to system server 242. This completes subprocess 108 and control is returned to process 68 (FIG. 6).

Those skilled in the art will appreciate that server node 240 need not be a part of cellular service 234. Server node 240 need only be accessible to cellular service 234 to interface server 242 with network 24.

Figure 17:
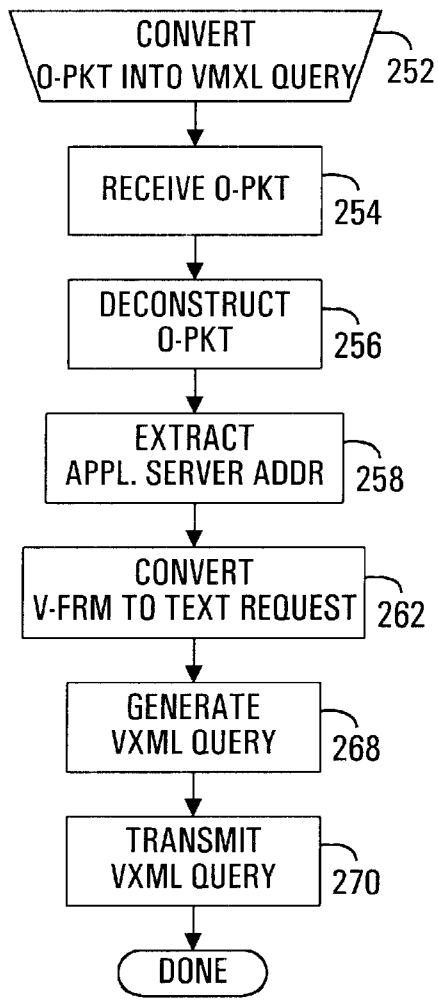
FIG. 17 shows a flow chart depicting a subprocess for converting an origination packet into a VXML query in accordance with an alternative preferred embodiment of the present invention.

FIG. 17 shows a flow chart depicting a subprocess for converting origination packet 50 into VXML query 244 in accordance with an alternative (voice-browser) preferred embodiment of the present invention. The following discussion refers to FIGS. 15, 16, and 17.

Following subprocess 108, origination packet 50 has arrived at system server 242 (FIGS. 15 and 16). Process 248 (FIG. 16) then executes converting subprocess 252 (FIGS. 16 and 17) to convert origination packet 50 into markup-language query 244.

Within a reception element 252 (FIG. 15) in server 242, a receiving task 254 (FIG. 17) receives origination packet 50 from network 24.

A deconstructing task 256 (FIG. 17) then deconstructs origination packet 50. Origination packet 50 has now been "broken" into its component parts for analysis, conversion, and configuration.

An extraction task 128 (FIG. 17) then extracts a physical address of application server 232 from logical destination address 62. This extraction may be performed through the use of a table look-up operation or other scheme known to those skilled in the art.

Within a speech-to-text converter 260 (FIG. 15), a task 262 (FIG. 17) converts voice frame 54 of origination request 30 into a text request 264 (FIG. 15). Those skilled in the art will appreciate that text request 264 is intended for computer interpretation and need not be "text" in the human-readable sense.

Text request 264 is then input to a voice-extensible markup-language (VXML) page processor 266 (FIG. 15), where a task 268 (FIG. 17) generates VXML query 244. A following task 268 (FIG. 17) then transmits VXML query 244 to application processor 232 (FIG. 15).

The voice-extensible markup language (VXML) is the desired markup language for the preferred voice-browser embodiment. Other markup languages (ML) may also be used to serve specific requirements. The use of other markup languages or even other language structures does not depart from the spirit of the present invention.

In a task 270 (FIG. 17), VXML page processor 266 (FIG. 15) then transmits VXML query 244 to application server 232. With the transmission of VXML query 244, subprocess 252 is complete and control returns to process 248 (FIG. 16).

Application server 232 (FIGS. 15 and 16) receives VXML query 244 and responds by executing a task 272 (FIG. 16) to fetch an appropriate VXML reply 246. VXML reply 246 is then transmitted back to VXML page processor 266 (i.e., to system server 242). The internal operations of application server 232 are well known to those skilled in the art and therefore beyond the scope of this discussion.

In the preferred voice-browser embodiment, application server 232 is desirably a VXML page server coupled to page processor 266 (i.e., to system server 242) via any convenient path. If the interconnection path is a packet-switched network, such as the Internet, then application server 232 may be a conventional VXML-page Web server on the World Wide Web.

Figure 18:
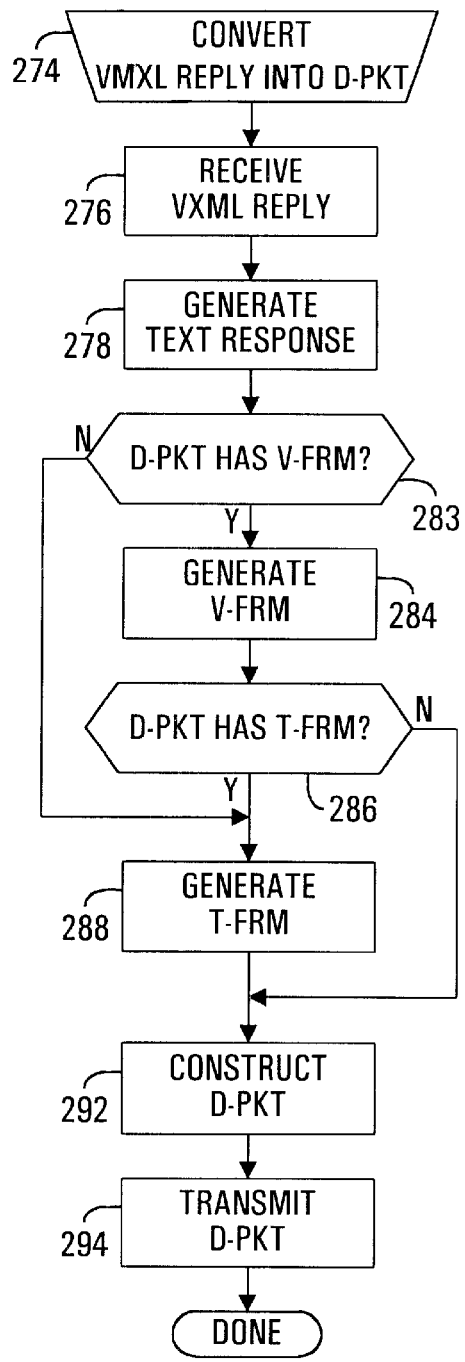
FIG. 18 shows a flow chart depicting a subprocess for converting a VXML reply into a destination packet in accordance with an alternative preferred embodiment of the present invention.

FIG. 18 shows a flow chart depicting a subprocess 274 for converting VXML reply 244 into destination packet 52 in accordance with an alternative (voice-browser) preferred embodiment of the present invention. The following discussion refers to FIGS. 15, 16, and 18.

Within VXML page processor 266 of system server 242 (FIG. 15), subprocess 274 (FIGS. 16 and 18) executes a task 276 (FIG. 18) to receive VXML reply 246 from application server 232. A task 278 then generates a text response 280 in response to VXML reply 246.

Text response 280 is passed to a text-to-speech/text converter 282 (FIG. 15). As discussed hereinafter, when destination packet 52 is to contain voice frame 54, text-to-speech/text converter 282 will convert text response 280 to voice frame 54, i.e., function as a text-to-speech converter. Similarly, when destination packet 52 is to contain text frame 56, text-to-speech/text converter 282 will convert text response 280 to text frame 56, i.e., function as a text-to-text converter. Those skilled in the art will appreciate that, as discussed hereinbefore in conjunction with text request 264, text response 280 is intended for computer interpretation and need not be "text" in the human-readable sense. Text frame 56, on the other hand, contains text intended for human readability. For text-to-text conversions, therefore, text-to-speech/text converter 282 may be called upon to convert between different forms of "text."

Within text-to-speech/text converter 282, a query task 283 (FIG. 18) determines if destination packet 52 is to contain voice frame 54 (FIGS. 3 and 5).

If query task 283 determines that destination packet 52 is to contain voice frame 54, then in a task 284 (FIG. 18), text-to-speech/text converter 282 (FIG. 15) serves as a text-to-speech converter and generates voice frame 54 from text response 280.

Following task 284, a query task 286 (FIG. 18) determines if destination packet 52 is to contain text frame 56 (FIGS. 4 and 5).

If query task 283 determines that destination packet 52 is not to contain voice frame 54 (i.e., contains text frame 56 only, as in FIG. 4) or query task 286 determines that destination packet 52 is to contain text frame 56 (i.e., contains both voice frame 54 and text frame 56, as in FIG. 5), then in a task 288 (FIG. 18), text-to-speech/text converter 282 (FIG. 15) serves as a text-to-text converter and generates text frame 56 from text response 280.

If query task 286 determines that destination packet 52 is not to contain text frame 56 (i.e., contains voice frame 54 only, as in FIG. 3) or following task 288, voice and/or text frames 54 and/or 56 (i.e., the components of destination packet 52) are passed to transmission element 290, where a task 292 (FIG. 18) constructs destination packet 52. Those skilled in the art will appreciate that, in the preferred voice-browser embodiment, some components of destination packet 52 are provided by system server 242 from origination packet 50 discussed hereinbefore.

Following task 292, a task 294 (FIG. 18) transmits destination packet to subscriber unit 30. Task 294 completes subprocess 274 and control returns to process 248 (FIG. 16).

Those skilled in the art will appreciate that server 242 is depicted as a single entity (e.g., a single computer) residing in a single locale. Conversely, server 242 may be distributed, i.e., server 242 may be a plurality of entities residing in a plurality of locales. In this case, portions of server 242 may be individual entities interconnected into a single whole. The method of interconnect is preferably a packet-switched network (e.g., the Internet). Variations in the configuration and interconnections of server 242 do not depart from the spirit of the present invention.

FIG. 12 shows a flow chart depicting subprocess 164 for routing destination packet 52 from server 242 to subscriber unit 30 in accordance with a preferred voice-browser embodiment of the present invention. The following discussion refers to FIGS. 15, 16, and 12.

Network 24 (FIG. 15) performs subprocess 164 (FIGS. 16 and 12) to route destination packet 52 from server 242 to subscriber unit 30.

Routing task 166 (FIG. 12) routes destination packet 52 from server 242 through server node 240 and to subscriber cell site 236. This routing may take any convenient path and may traverse a packet-switched network, such as the Internet.

Allocating task 168 (FIG. 12) then briefly allocates non-circuit-switched service (NCSS) traffic channel 238 for use by subscriber unit 30. Task 168 involves a brief communication between subscriber cellular service 234 and subscriber unit 30 over a control channel (not shown), which results in the brief allocation of traffic channel 238 by cellular service 234.

Another routing task 170 (FIG. 12) then routes destination packet 52 from subscriber cell site 236 to subscriber unit 30 via NCSS channel 238. This completes subprocess 164 and control is returned to process 248 (FIG. 16). NCSS channel 238 is briefly allocated for transmission of destination packet 52. In accordance with conventional NCSS services, NCSS channel 238 is de-allocated as soon as destination packet 52 has been received by subscriber unit 30, whereupon NCSS channel 238 is available for other uses by network 24.

Those skilled in the art will appreciate that server node 240 need not be a part of subscriber cellular service 234. Server node 240 need only be accessible to cellular service 234 to fulfill all required functions, i.e., to interface server 242 with network 24.

NCSS channel 238 may be allocated at the inception of the receipt of destination packet 52 at subscriber cell site 236. This allows a windowing function similar to that described hereinbefore in conjunction with origination packet 50. This is not a requirement, however, and the allocation of NCSS channel 238 may be carried out after the reception of destination packet 52 at cell site 236 has been completed. This serves to reduce the overall allocation and transmission time.

Those skilled in the art will appreciate that various combinations of the tasks performed within server 242 may be performed by a processing element and/or various tables. The use of such a processing element and/or such tables to perform any of such tasks does not depart from the spirit of the present invention.

FIG. 13 shows a flow chart depicting subprocess 172 for presenting the contents of destination packet 52 to subscriber 250. FIG. 14 shows a block diagram depicting packet-destination elements of subscriber unit 30 of voice-browsing system 230 in accordance with a preferred voice-browser embodiment of the present invention. The following discussion refers to FIGS. 15, 16, 13, and 14.

Following subprocess 164, destination packet 52 has arrived at subscriber unit 30 (FIGS. 15 and 14). Within an input element 176 (FIG. 14), receiving task 178 (FIG. 16) receives destination packet 52 from network 24.

Process 68 then executes subprocess 172 (FIGS. 16 and 13) to present the contents of destination packet 52 to subscriber 250 (FIG. 14).

Within text-extraction element 180 (FIG. 14), text-frame query task 182 (FIG. 13) determines if destination packet 52 contains text frame 56.

If query task 182 determines that destination packet 52 contains text frame 56, then extracting task 184 extracts text frame 56 from destination packet 52.

Within text-decoding element 186 (FIG. 14), decoding task 188 (FIG. 13) decodes text frame 56 into text signal 190.

Within text-output element 192 (FIG. 14), displaying task 194 (FIG. 13) displays text signal 190 as text 196 upon display 198 for subscriber 250. Conventional user controls (not shown) may be implemented to control operation of display 198.

Following task 194 and within a voice-extraction element 200 (FIG. 14), voice-frame query task 202 (FIG. 13) determines if destination packet 52 contains voice frame 54.

If query task 202 determines that destination packet 52 does not contain voice frame 54, then in notification element 204 (FIG. 14) notifying task 206 (FIG. 13) notifies recipient 174 that a text dispatch has been received. This notification may be in the form of a brief audible alarm, vibration, or the like.

If query task 182 determines that destination packet 52 does not contain text frame 56 or query task 202 determines that destination packet 52 contains voice frame 54, then in voice-extraction element 200 (FIG. 14) extracting task 208 (FIG. 13) extracts voice frame 54 from destination packet 52.

Within voice-decoding element 210 (FIG. 14), decoding task 212 (FIG. 13) decodes voice frame 54 into voice signal 76.

In notification element 214 (FIG. 14), notification query task 216 (FIG. 13) determines if subscriber 250 prefers to be notified of the receipt of destination packet 52 prior to the output thereof. Desirably, subscriber 250 may program subscriber unit 30 to specify this preference.

If query task 216 determines that subscriber 250 prefers to be notified, then notifying task 218 (FIG. 13) notifies recipient 174 that a voice dispatch has been received. This notification may be in the form of a brief audible alarm, vibration, or the like.

Following task 218 or if query task 216 determines that subscriber 250 does not wish to be notified of the reception of a voice dispatch, then within delay element 220 (FIG. 14) delay query task 222 (FIG. 13) determines if subscriber 250 prefers the outputting of voice dispatches delayed until requested. Desirably, subscriber 250 may program subscriber unit 30 to specify this preference.

If query task 222 determines that recipient 174 prefers dispatch output delayed, then delaying task 224 (FIG. 13) delays dispatch output until requested by subscriber 250. This may be useful when subscriber 250 cannot be disturbed by the outputting of a voice dispatch.

Following task 224 or if query task 222 has determined that subscriber 250 does not wish dispatch output to be delayed, within voice-output element 226 outputting task 228 outputs voice signal 76 as voice (audible sound) 78 for recipient 174. Following task 206 or task 228, subprocess 172 and process 248 are complete.

In summary, the present invention teaches an improved system 230 and process 248 for voice browsing is provided. System 230 uses a conventional cellular telephone system while effectively eliminating dial-up delay. System 230 allows inter-cellular-service communication without the need of specialized equipment. By using cellular services 32 and 34, a plurality of transmission points in a given area is provided, thus minimizing shadowing. System 230 permits voice browsing using a conventional (non-proprietary) cellular telephone system. System 230 provides silent (text) reception of a voice page. Since subscriber unit 30 is a standard digital cellular subscriber unit, subscriber unit 30 may be used to directly access cellular service 234 in a conventional cellular manner, i.e., may place or receive a traditional cellular telephone call. The functionality of system 230 may be added to any given subscriber unit 30 while retaining full cell-phone functionality. Conversely, the functionality of system 230 may be added to any given subscriber unit 30 in lieu of some or all cell-phone functionality. It is desirable, however, that 911 emergency-call functionality be maintained.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of voice browsing utilizing a global telecommunication network, at least a portion of which provides a cellular telephone service, said method comprising:
   a) transmitting an origination packet containing a voice frame from a digital cellular subscriber unit of said cellular telephone service of said global telecommunication network;
   b) routing said origination packet to a system server via said global telecommunication network utilizing a wireless non-circuit-switched service thereof;
   c) converting, within said system server, said origination packet into a markup-language (ML) query;
   d) transmitting said ML query from said system server to an application server;
   e) fetching, within said application server, an ML reply in response to said ML query;

f) receiving said ML reply from said application server at said system server;

g) converting said ML reply into a destination packet within said system server;

h) routing said destination packet to said subscriber unit via said global telecommunication network utilizing said wireless non-circuit-switched service thereof; and i) receiving said destination packet at said subscriber unit.

2. A voice-browsing method as claimed in claim 1 additionally comprising generating said origination packet in said subscriber unit.

3. A voice-browsing method as claimed in claim 2 wherein said generating activity comprises:

producing an audio signal;

encoding said audio signal into said voice frame; and enclosing said voice frame within said origination packet.

4. A voice-browsing method as claimed in claim 1 additionally comprising presenting said destination packet in said subscriber unit.

5. A voice-browsing method as claimed in claim 4 wherein said destination packet contains a voice frame and said presenting activity comprises:

extracting said voice frame from said destination packet;

decoding said voice frame into an audio signal; and audibly outputting said audio signal.

6. A voice-browsing method as claimed in claim 5 wherein:

said presenting activity additionally comprises delaying said outputting activity until requested by a recipient; and said outputting activity audibly outputs said audio signal upon completion of said delaying activity.

7. A voice-browsing method as claimed in claim 6 wherein said presenting activity additionally comprises notifying said recipient of a presence of said audio signal.

8. A voice-browsing method as claimed in claim 4 wherein said destination packet contains a text frame and said presenting activity comprises:

extracting said text frame from said destination packet;

decoding said text frame into text; and displaying said text.

9. A voice-browsing method as claimed in claim 1 wherein:

said origination packet contains a logical address of an application server; and said converting activity c) comprises obtaining a physical address of said application server in response to said logical address.

10. A voice-browsing method as claimed in claim 1 wherein said converting activity c) converts said voice frame into a text request.

11. A voice-browsing method as claimed in claim 10 wherein said converting activity c) comprises generating an ML query from said text request.

12. A voice-browsing method as claimed in claim 1 wherein said converting activity g) comprises generating a data response from said ML reply.

13. A voice-browsing method as claimed in claim 12 wherein said converting activity g) additionally comprises:

generating one of a voice frame and a text frame in response to said text response; and constructing said destination packet containing said one of said voice frame and said text frame within said system server.

14. A voice-browsing method as claimed in claim 1 additionally comprising:

generating, prior to said transmitting activity a), said origination packet within said subscriber unit; and allocating, after an inception of said generating activity, use of said non-circuit-switched service for said transmitting activity a).

15. A voice-browsing method as claimed in claim 1 wherein:

said subscriber unit is configured to wirelessly communicate via one of a circuit-switched service, a short-message service, and a packet-switched service; and said non-circuit-switched service comprises one of said short-message and packet-switched services.

16. A voice-browsing method as claimed in claim 1 wherein:

said global telecommunication network comprises a subscriber cell site in communication with said subscriber unit and said system server;

said routing activity b) comprises routing said origination packet from said subscriber unit to said subscriber cell site utilizing said non-circuit-switched service;

said routing activity b) additionally comprises routing said origination packet from said subscriber cell site to said system server;

said routing activity h) comprises routing said destination packet from said system server to said subscriber cell site; and said routing activity h) additionally comprises routing said destination packet from said subscriber cell site to said subscriber unit utilizing said non-circuit-switched service.

17. A system for voice browsing utilizing a global telecommunication network, at least a portion of which provides a cellular telephone service, said system comprising:

a subscriber unit configured to generate and transmit an origination packet, and to receive and present a destination packet, wherein said subscriber unit is a digital cellular subscriber unit of said cellular telephone service of said global telecommunication network; and a system server coupled to said subscriber unit via a wireless non-circuit-switched service of said global telecommunication network and configured to receive said origination packet from said subscriber unit, to convert said origination packet into a markup-language (ML) query, to fetch an ML reply from an application server in response to said ML query, to convert said ML reply into said destination packet, and to transmit said destination packet to said subscriber unit.

18. A voice-browsing system as claimed in claim 17 wherein said non-circuit-switched service is one of a short-message service and a packet-switched service.

19. A voice-browsing system as claimed in claim 17 wherein said subscriber unit comprises:

an audio input element configured to produce a n audio signal from an audible sound;

an encoding element coupled to said audio input element and configured to encode said audio signal to generate a voice frame;

an insertion element coupled to said encoding element and configured to incorporate said voice frame into said origination packet; and an r-f output element coupled to said insertion element and configured to transmit said origination packet to said system server via said wireless non-circuit-switched service.

20. A voice-browsing system as claimed in claim 17 wherein said destination packet contains a voice frame, and wherein said subscriber unit comprises:
- an r-f input element configured to receive said destination packet from said system server via said wireless non-circuit-switched service;
- an extraction element coupled to said r-f input element and configured to extract said voice frame from said destination packet;
- a decoding element coupled to said extraction element and configured to decode said voice frame into an audio signal; and an audio output element coupled to said decoding element and configured to audibly output said audio signal.

21. A voice-browsing system as claimed in claim 17 wherein said destination packet contains a text frame, and wherein said subscriber unit comprises:
- an r-f input element configured to receive said destination packet from said system server via said wireless non-circuit-switched service;
- an extraction element coupled to said r-f input element and configured to extract said text frame from said destination packet;
- a decoding element coupled to said extraction element and configured to decode said text frame into text; and
- a display element coupled to said decoding element and configured to display said text.

22. A voice-browsing system as claimed in claim 17 wherein said system server comprises:
- a reception element configured to receive said origination packet from said subscriber unit via said wireless non-circuit-switched service;
- a speech-to-text converter coupled to said reception element and configured to construct a text request in response to said origination packet;
- an ML page processor coupled to said speech to text converter and configured to generate an ML query from said text request, to fetch an ML reply from an application server in response to said ML query, and to generate a text response from said ML reply;
- a text-to-speech converter coupled to said ML page processor and configured to construct said destination packet in response to said ML text response; and
- a transmission element coupled to said text-to-speech converter and configured to transmit said destination packet to said subscriber unit via said wireless non-circuit-switched service.

23. A voice-browsing system as claimed in claim 17 wherein:
- said markup language (ML) is a voice-extensible markup language (VXML);
- said ML query is a VXML query;
- said ML reply is a VXML reply; and
- said application server is a VXML page application server.

24. A system for voice browsing utilizing a global telecommunication network, at least a portion of which provides cellular telephone service, said system comprising:
- a digital cellular subscriber unit of said cellular telephone service of said global telecommunication network, wherein said subscriber unit is configured to produce an audio signal from an audible sound, to encode said audio signal to generate an origination voice frame, to incorporate said origination voice frame into an origination packet, to transmit said origination packet via a wireless non-circuit-switched service of said global telecommunication network, to receive a destination packet via said wireless non-circuit-switched service, to extract a destination voice frame from said destination packet, to decode said destination voice frame into an audio signal, and to audibly output said audio signal; and
- a system server coupled to said subscriber unit via said wireless non-circuit-switched service and configured to receive said origination packet from said subscriber unit, to construct a text request in response to said origination packet, to generate a voice-extensible-markup-language (VXML) query from said text request, to fetch a VXML reply from an application server in response to said VXML query, to generate a text response from said VXML reply, to construct said destination packet in response to said text response, said destination packet including said destination voice frame formed in response to said text response, and to transmit said destination packet to said subscriber unit.

* * * * *

UNITED STATES PATENT AND TRADEMARK OFFICE
CERTIFICATE OF CORRECTION

PATENT NO.  : 6,426,956 B1
DATED       : July 30, 2002
INVENTOR(S) : Eshaugh Isaac Eteminan It is certified that error appears in the above-identified patent and that said Letters Patent is hereby corrected as shown below:

Column 1,
Line 35, replace "units i n" with -- units in --.

Column 9,
Line 7, replace "service 24" with -- service 34 --.
Line 25, add -- (CSS) -- after "Circuit-switched service".
Line 35, add -- (NCSS) -- after "non-circuit-switched service".

Column 16,
Line 47, please add a -- . -- and start a new paragraph after "198".

Column 26,
Line 57, replace "produce a n audio" with -- produce an audio --.

Signed and Sealed this

Nineteenth Day of November, 2002

Attest:

JAMES E. ROGAN
Attesting Officer     Director of the United States Patent and Trademark Office